US009374404B2

(12) United States Patent
Strasman et al.

(10) Patent No.: US 9,374,404 B2
(45) Date of Patent: Jun. 21, 2016

(54) STREAMING MEDIA FLOWS MANAGEMENT

(75) Inventors: Nery Strasman, Ramat Gan (IL); Ren Finley, San Jose, CA (US)

(73) Assignee: Vasona Networks Inc., Santa Clara, CA (US)

(*) Notice: Subject to any disclaimer, the term of this patent is extended or adjusted under 35 U.S.C. 154(b) by 1253 days.

(21) Appl. No.: 13/215,413

(22) Filed: Aug. 23, 2011

(65) Prior Publication Data

US 2012/0314718 A1 Dec. 13, 2012

Related U.S. Application Data

(63) Continuation-in-part of application No. 13/129,299, filed on Jun. 10, 2011, now Pat. No. 8,704,726.

(60) Provisional application No. 61/377,108, filed on Aug. 26, 2010.

(51) Int. Cl.
| | |
|---|---|
| *G06F 15/16* | (2006.01) |
| *H04L 29/06* | (2006.01) |
| *H04N 21/2343* | (2011.01) |
| *H04N 21/845* | (2011.01) |

(52) U.S. Cl.
CPC .......... *H04L 65/4084* (2013.01); *H04L 65/602* (2013.01); *H04L 65/80* (2013.01); *H04N 21/23439* (2013.01); *H04N 21/8456* (2013.01)

(58) Field of Classification Search
CPC . H04L 67/1002; H04L 67/02; H04L 67/1095; H04L 67/306; H04L 67/42; H04L 65/4084; H04L 67/10; H04L 65/4076; H04L 67/06; H04L 65/1069; H04L 67/18; H04L 65/602

USPC ......... 709/201–203, 212, 216, 217, 219, 231, 709/232, 233, 236
See application file for complete search history.

(56) References Cited

U.S. PATENT DOCUMENTS

| | | |
|---|---|---|
| 6,385,673 B1 | 5/2002 | DeMoney |
| 6,697,378 B1 | 2/2004 | Patel |
| 6,795,506 B1* | 9/2004 | Zhang et al. ............. 375/240.26 |
| 8,205,004 B1 | 6/2012 | Kaufman et al. |
| 8,379,515 B1* | 2/2013 | Mukerji ......................... 370/229 |
| 2003/0067872 A1* | 4/2003 | Harrell et al. .................. 370/229 |
| 2004/0203825 A1 | 10/2004 | Daniel et al. |
| 2005/0114538 A1 | 5/2005 | Rose |
| 2005/0148314 A1 | 7/2005 | Taglienti et al. |
| 2005/0204046 A1 | 9/2005 | Watanabe |
| 2008/0212480 A1 | 9/2008 | Shimonishi |
| 2009/0327079 A1 | 12/2009 | Parker et al. |

(Continued)

*Primary Examiner* — Brian J Gillis
*Assistant Examiner* — Thao Duong
(74) *Attorney, Agent, or Firm* — Reches Patents

(57) ABSTRACT

A method, system and a computer program product. The method may include: receiving a plurality of chunk requests from clients that are hosted on user devices; generating, in response to a first chunk request of the plurality of chunk requests, a first set of chunk requests for receiving different bit rate versions of the first chunk; sending to a media streamer the first set of chunk requests; receiving, from the media streamer, the different bit rate versions of the first chunk; generating a first new chunk, based on bit rate allocated for streaming of a media flow to the first client; wherein the first new chunk comprises a plurality of frames selected from at least two bit rate versions of the first chunk; and assisting in streaming to the first client, the first new chunk.

37 Claims, 12 Drawing Sheets

(56) References Cited

U.S. PATENT DOCUMENTS

| | | |
|---|---|---|
| 2010/0034089 A1 | 2/2010 | Kovvali et al. |
| 2010/0074275 A1 | 3/2010 | Sahai |
| 2010/0131671 A1* | 5/2010 | Kohli et al. .................. 709/233 |
| 2010/0151899 A1 | 6/2010 | Lekutai |
| 2010/0195602 A1 | 8/2010 | Kovvali et al. |
| 2010/0235438 A1* | 9/2010 | Narayanan et al. ........... 709/203 |
| 2011/0032898 A1 | 2/2011 | Kazmi et al. |
| 2011/0082924 A1* | 4/2011 | Gopalakrishnan ............ 709/223 |
| 2011/0145726 A1 | 6/2011 | Wei et al. |
| 2011/0197239 A1 | 8/2011 | Schlack |
| 2011/0302238 A1* | 12/2011 | Sood et al. .................... 709/203 |
| 2012/0039191 A1 | 2/2012 | Foster et al. |
| 2012/0052866 A1 | 3/2012 | Froehlich et al. |
| 2012/0087260 A1 | 4/2012 | Devarapalli et al. |
| 2012/0265892 A1* | 10/2012 | Ma et al. ....................... 709/231 |
| 2013/0016620 A1 | 1/2013 | Den Hartog et al. |
| 2013/0163428 A1 | 6/2013 | Lee et al. |

\* cited by examiner

STREAMING MEDIA FLOWS MANAGEMENT

RELATED APPLICATIONS

This application claims priority from U.S. provisional patent Ser. No. 61/377,108 filing date Aug. 26, 2010 which is incorporated herein by reference. This application is a continuation in part of U.S. patent application Ser. No. 13/129,399 filing date May 16, 2011.

BACKGROUND OF THE INVENTION

Video streaming is an important application over the Internet. The number of available streams, servers and users is rapidly growing and is the leading consumer of bandwidth. The following text provides a short description about how streaming is performed today and one of the problem this introduces.

"Classical" Streaming

Streaming in its original form was performed by transmitting a stream from the server to a client with little or no feedback. If feedback was provided, this occurred in cases the client did not receive data within a given time. The feedback could be done by use or lack of Acknowledgement (ACK) messages if the stream was sent over the TCP protocol or by resending requests for the stream by the client. In many cases the protocol used was RTSP.

Adaptive Bit Rate with "Classical" Streaming

Since the server and the client do not have clear visibility of the medium between them, it is practically impossible for the server to know if a stream with one specific bit-rate could reach the client or whether bandwidth congestion on the way would block the client from receiving it. Therefore, servers adopted different adaptive bit rate methods. In all cases, the servers maintain a few versions of the stream, each one encoded in a different bit-rate. In the general case, if a segment of a stream with a specific bit rate did not reach the client, the server would try to retransmit the stream with a lower bit rate.

Lower bit rates can be achieved by lowering spatial resolution, number of frames per second or simply applying stronger compression to the stream. In cases where the clients received all the transmitted segments, the server could revert to higher bit rate versions of the stream and transmit those. In these cases, the device which decided which bit rates to use was the server.

HTTP Streaming for different reasons including firewall restrictions and compatibility between Different servers and clients, the market has generally reverted (or is in the process of Reverting) to HTTP streaming. When performing HTTP streaming the client requests a file download over HTTP. In this case, the client may request only parts of a file or all of it. If the client desires, it may stop the downloading of the file and ask the server to download a different file. To sum this up, in the simplest sense, HTTP streaming involves a file download from the server to the client. This type of streaming is often known as Progressive Download (PD).

Adaptive Bit Rate (ABR) with HTTP Streaming

Adaptive bit rate with HTTP streaming is a relatively new technology. When it is used, the server first saves a few different versions of the video clip. The difference is usually a bitrate difference but there might also be resolution or other differences between the versions. The different versions are chopped into small segments usually known as fragments or chunks (these words are used interchangeably in this application) which have a playback duration of a few seconds. The server sends the client a manifest file. The manifest file informs the client which versions are available, the duration of the fragments and where the client can find the different fragments. The client then asks the server to transmit specific fragments of the stream ABR HTTP streaming can also be used with live streaming. In this case, the manifest file is constantly updated and sent to the client. In some ABR cases, each bit rate chunk is stored as a single file. In other cases, each file holds the entire stream with one specific bit rate and different chunks are simply different segments of the file. Other implementations may include only one file which is segmented by bit rates and chunks.

As in classical streaming, the client and server do not have any information regarding the medium between them. Therefore, a mechanism is needed here also to determine the stream's bit rate. In this case it is the client which makes the decision. Algorithms implemented in the client decide which bit rate chunk to request from the server. The decision may be influenced by several factors such as available buffer space, processing power of the client and bandwidth considerations such as: if the previously requested chunk was not received (probably because of network congestion)—request a lower bit rate fragment next time. Occasionally the client may request a chunk with a bit rate which is higher than the last received chunk.

In all the cases described above, when a stream is encoded for a few versions, it is always encoded in constant bitrate (CBR). Using variable bitrate (VBR) encoding would complicate the mechanisms which try to assess the available bandwidth and would also complicate the actual delivery mechanisms. The chunks, or fragments as they are usually called, have durations of a few seconds. Typical durations range from 2 to 8 seconds. This reduces significantly the granularity and resolution of bitrate decisions. In some cases a finer granularity is needed. These cases may include situations were some streams share the same delivery medium.

Another problem that arises from using CBR encoding is that the visual quality tends to vary. For example, two scenes with different encoding complexity would need to be encoded at two different bitrates in order to achieve similar visual quality. It is obvious therefore, that if all scenes are encoded with the same bitrate, the visual quality would vary. This may be important in a case where two or more clients share the same pipe for streaming. An operator may prefer to allow the devices to receive the stream at a constant video quality, making the viewing experience more acceptable. In order to achieve this, some sort of multiplexing of the streams is needed which would include transforming CBR streams into VBR streams.

Previous Solutions

In non-streaming environments there are some solutions to this problem. These solutions include open-loop and closed-loop statistical multiplexing with partial or full re-encoding. These re-encoding techniques include re-quantization, re-quantization with motion drift correction or full decoding and encoding. In streaming environments there are no known solutions for creating multiplexes of VBR streams. There are, however, transcoders that re-encode the streams and may turn them into VBR streams where the variability of the bitrate depends on the assessed available bandwidth on the pipe. This process is expensive in that it requires significant resources to perform the transcoding. Additionally, each new generation of encoding adds noise to the original content and degrades is quality regardless of the degradation which may occur due to the bitrate reduction.

SUMMARY OF THE INVENTION

According to various embodiments of the invention a method is provided, the method may include: allocating or receiving allocated bit rates for a plurality of streaming media flows, each streaming media flow may include a plurality of chunks and is expected to flow over a last mile channel that is bandwidth limited; receiving a plurality of chunk requests from clients that are hosted on user devices; wherein the plurality of chunk requests are for obtaining chunks from a plurality of streaming media flows, each chunk request defines a requested bit rate; wherein the plurality of chunk requests comprise a first chunk request that is sent from a first client and is for obtaining a first chunk of a first requested bit rate; generating, in response to the first chunk request, a first set of chunk requests for receiving different bit rate versions of the first chunk; sending to a media streamer the first set of chunk requests; receiving, from the media streamer, the different bit rate versions of the first chunk; generating a first new chunk, based on bit rate allocated for a streaming of a media flow to the first client; wherein the first new chunk comprises a plurality of frames selected from at least two bit rate versions of the first chunk; and assisting in streaming to the first client, the first new chunk.

The method may include generating the first new chunk that may include at least one frame of the first requested bit rate and at least one frame of an additional bit rate that differs from the requested bit rate.

The first new chunk may not include any frame of the first requested bit rate.

The set of different bit rate versions may include the first requested bit rate, at least one bit rate that is higher than the first requested bit rate and at least one bit rate that is lower than the requested bit rate.

The generating of the first new chunk may include omitting at least one frame from the first new chuck so that the first new chunk does not include any bit rate version of the at least one frame that was included in the first chunk.

The method may include omitting redundant information from at least one frame of the first new chunk.

The redundant information may include stuffing bits.

The plurality of chunk requests may include a first group of chunk request for receiving a first group of chunks, the first group of chunk requests being sent from a first group of clients; wherein the method may include: generating, in response to each chunk request of the first group of chunk requests, a set of chunk requests, each set of chunk requests is for receiving different bit rate versions of the chunk requested by the chunk request of the first group of chunks; sending to a media streamer the first set of chunk requests; receiving, from the media streamer, the different bit rate versions of the chunks of the first group of chunks; generating a first group of new chunks, based on bit rates allocated for streaming of media flows to the first group of the client, wherein each new chunk of the first group of new chunks may include a plurality of frames selected from at least two bit rate versions of a chunk that corresponds to the new chunk; and assisting in streaming to the first group of clients, the first group of new chunks.

The plurality of chunk requests further may include a second group of chunk requests for receiving a second group of chunks, the second group of chunk requests being sent from a second group of clients; wherein the method may include: sending to the media streamer the second set of chunk requests; receiving, from the media streamer, chunks of the second group of chunks; and assisting in streaming to the second group of clients, the second group of chunks.

The method may include changing a second chunk request to comply with an allocated bit rate, if a requested bit rate associated with the second chunk does not comply with the allocated bit rate, to provide at least one new second chunk request; and sending the new second chunk request to the media streamer.

A computer program product may be provided and may include a non-transitory computer readable medium that stores instructions for: allocating or receiving allocated bit rates for a plurality of streaming media flows, each streaming media flow may include a plurality of chunks and is expected to flow over a last mile channel that is bandwidth limited; receiving a plurality of chunk requests from clients that are hosted on user devices; wherein the plurality of chunk requests are for obtaining chunks from a plurality of streaming media flows, each chunk request defines a requested bit rate; wherein the plurality of chunk requests comprise a first chunk request that is sent from a first client and is for obtaining a first chunk of a first requested bit rate; generating, in response to the first chunk request, a first set of chunk requests for receiving different bit rate versions of the first chunk; sending to a media streamer the first set of chunk requests; receiving, from the media streamer, the different bit rate versions of the first chunk; generating a first new chunk, based on bit rate allocated for a streaming of a media flow to the first client; wherein the first new chunk may include a plurality of frames selected from at least two bit rate versions of the first chunk; and assisting in streaming to the first client, the first new chunk.

The non-transitory computer readable medium may store instructions for generating the first new chunk that may include at least one frame of the first requested bit rate and at least one frame of an additional bit rate that differs from the requested bit rate.

The first new chunk may not include any frame of the first requested bit rate.

The set of different bit rate versions may include the first requested bit rate, at least one bit rate that is higher than the first requested bit rate and at least one bit rate that is lower than the requested bit rate.

The non-transitory computer readable medium may store instructions for omitting at least one frame from the first new chuck so that the first new chunk does not include any bit rate version of the at least one frame that was included in the first chunk.

The non-transitory computer readable medium may store instructions for omitting redundant information from at least one frame of the first new chunk.

The redundant information may include stuffing bits.

The plurality of chunk requests comprise a first group of chunk request for receiving a first group of chunks, the first group of chunk requests being sent from a first group of clients; and the non-transitory computer readable medium may store instructions for generating, in response to each chunk request of the first group of chunk requests, a set of chunk requests, each set of chunk requests is for receiving different bit rate versions of the chunk requested by the chunk request of the first group of chunks; sending to a media streamer the first set of chunk requests; receiving, from the media streamer, the different bit rate versions of the chunks of the first group of chunks; generating a first group of new chunks, based on bit rates allocated for streaming of media flows to the first group of the client, wherein each new chunk of the first group of new chunks may include a plurality of frames selected from at least two bit rate versions of a chunk that corresponds to the new chunk; and assisting in streaming to the first group of clients, the first group of new chunks.

The plurality of chunk requests may include a second group of chunk requests for receiving a second group of chunks, the second group of chunk requests being sent from a second group of clients; wherein the non-transitory computer readable medium may store instructions for: sending to the media streamer the second set of chunk requests; receiving, from the media streamer, chunks of the second group of chunks; and assisting in streaming to the second group of clients, the second group of chunks.

The non-transitory computer readable medium may store instructions for changing a second chunk request to comply with an allocated bit rate, if a requested bit rate associated with the second chunk does not comply with the allocated bit rate, to provide at least one new second chunk request; and sending the new second chunk request to the media streamer.

A system may be provided and may include an input interface, a processing module and an output interface; wherein the system may be arranged to allocate or receive allocated bit rates for a plurality of streaming media flows, each streaming media flow may include a plurality of chunks and is expected to flow over a last mile channel that is bandwidth limited; wherein the input interface may be arranged to receive a plurality of chunk requests from clients that are hosted on user devices; wherein the plurality of chunk requests are for obtaining chunks from a plurality of streaming media flows, each chunk request defines a requested bit rate; wherein the plurality of chunk requests comprise a first chunk request that is sent from a first client and is for obtaining a first chunk of a first requested bit rate; wherein the processing module may be arranged to generate, in response to the first chunk request, a first set of chunk requests for receiving different bit rate versions of the first chunk; wherein the output interface may be arranged to send to a media streamer the first set of chunk requests; wherein the input interface is further arranged to receive, from the media streamer, the different bit rate versions of the first chunk; wherein the processing module is further arranged to generate a first new chunk, based on bit rate allocated for a streaming of a media flow to the first client; wherein the first new chunk may include a plurality of frames selected from at least two bit rate versions of the first chunk; and wherein the output interface may be arranged to assist in streaming to the first client, the first new chunk.

The processing module may be arranged to generate the first new chunk, wherein the first new chunk may include at least one frame of the first requested bit rate and at least one frame of an additional bit rate that differs from the requested bit rate.

The processing module may be arranged to generate the first new chunk, the first new chunk does not include any frame of the first requested bit rate.

The set of different bit rate versions may include the first requested bit rate, at least one bit rate that is higher than the first requested bit rate and at least one bit rate that is lower than the requested bit rate.

The processing module may be arranged to omit at least one frame from the first new chuck so that the first new chunk does not include any bit rate version of the at least one frame that was included in the first chunk.

The processing module may be arranged to omit redundant information from at least one frame of the first new chunk.

The redundant information may include stuffing bits.

The plurality of chunk requests comprise a first group of chunk request for receiving a first group of chunks, the first group of chunk requests being sent from a first group of clients; wherein the processing module may be arranged to generate, in response to each chunk request of the first group of chunk requests, a set of chunk requests, each set of chunk requests is for receive different bit rate versions of the chunk requested by the chunk request of the first group of chunks; wherein the output interface is further arranged to send to a media streamer the first set of chunk requests; wherein the input interface is further arranged to receive, from the media streamer, the different bit rate versions of the chunks of the first group of chunks; wherein the processing module may be arranged to generate a first group of new chunks, based on bit rates allocated for streaming of media flows to the first group of the client; wherein each new chunk of the first group of new chunks may include a plurality of frames selected from at least two bit rate versions of a chunk that corresponds to the new chunk; and wherein the output interface may be arranged to assist in streaming to the first group of clients, the first group of new chunks.

The plurality of chunk requests further may include a second group of chunk requests for receiving a second group of chunks, the second group of chunk requests being sent from a second group of clients; wherein the system may be arranged to send to the media streamer the second set of chunk requests; receive, from the media streamer, chunks of the second group of chunks; and assist in streaming to the second group of clients, the second group of chunks.

The processing module may be arranged to change a second chunk request to comply with an allocated bit rate, if a requested bit rate associated with the second chunk does not comply with the allocated bit rate, to provide at least one new second chunk request; and send the new second chunk request to the media streamer.

A method may be provided and may include: allocating or receiving allocated bit rates for a plurality of streaming media flows, each streaming media flow may include a plurality of chunks and is expected to flow at a requested constant bit rate over a last mile channel that is bandwidth limited; receiving a plurality of chunk requests from clients that are hosted on user devices; wherein the plurality of chunk requests are for obtaining chunks from a plurality of streaming media flows, each chunk request defines a requested bit rate; sending to a media streamer the plurality of chunk requests; receiving, from the media streamer, a chunk that is scheduled for size reduction; wherein the chunk was requested by a chunk request out of the plurality of chunk requests; reducing a size of the chunk removing excess information, to provide a reduced chunk; and assisting in streaming to a client, the reduced chunk; wherein the reduced chunk is being streamed to the client at a bit rate that is lower than a requested constant bit rate associated with the client.

A computer program product may be provided and may include a non-transitory computer readable medium that stores instructions for: allocating or receiving allocated bit rates for a plurality of streaming media flows, each streaming media flow may include a plurality of chunks and is expected to flow at a requested constant bit rate over a last mile channel that is bandwidth limited; receiving a plurality of chunk requests from clients that are hosted on user devices; wherein the plurality of chunk requests are for obtaining chunks from a plurality of streaming media flows, each chunk request defines a requested bit rate; sending to a media streamer the plurality of chunk requests; receiving, from the media streamer, a chunk that is scheduled for size reduction; wherein the chunk was requested by a chunk request out of the plurality of chunk requests; reducing a size of the chunk removing excess information, to provide a reduced chunk; and assisting in streaming to a client, the reduced chunk; wherein the reduced chunk is being streamed to the client at a bit rate that is lower than a requested constant bit rate associated with the client.

A system may be provided and may include an input interface, an output interface and a processing module. The system may be arranged to allocating (by the processing module) or receiving (by the input interface) allocated bit rates for a plurality of streaming media flows, each streaming media flow may include a plurality of chunks and is expected to flow at a requested constant bit rate over a last mile channel that is bandwidth limited; receiving (by the input interface) a plurality of chunk requests from clients that are hosted on user devices; wherein the plurality of chunk requests are for obtaining chunks from a plurality of streaming media flows, each chunk request defines a requested bit rate; sending (by the output interface) to a media streamer the plurality of chunk requests; receiving (by the input interface), from the media streamer, a chunk that is scheduled for size reduction; wherein the chunk was requested by a chunk request out of the plurality of chunk requests; reducing (by the processing module) a size of the chunk removing excess information, to provide a reduced chunk; and assisting (by the output interface) in streaming to a client, the reduced chunk; wherein the reduced chunk is being streamed to the client at a bit rate that is lower than a requested constant bit rate associated with the client.

The reducing of the size may include omitting a frame of the chunk.

The reducing of the size may include omitting excessive information included in at least one frame of the chunk.

A method for streaming media flow management may be provided and may include: allocating or receiving an allocated bit rate for a streaming media flow that comprises a plurality of chunks and is expected to flow over a last mile channel that is bandwidth limited; receiving a chunk request from a client that is hosted on a user device; wherein the request is for obtaining chunk from the streaming media flow at a requested bit rate; sending to a media streamer the chunk request; receiving, from the media streamer, the requested bit rate version of the chunk; generating a new chunk, based on the allocated bit rate for the streaming flow; wherein the generating comprises performing a video aware omission of redundant information from at least one frame of the new chunk; and assisting in streaming to the client, the new chunk.

A computer program product may be provided and may include a non-transitory computer readable medium that stores instructions for allocating or receiving an allocated bit rate for a streaming media flow that comprises a plurality of chunks and is expected to flow over a last mile channel that is bandwidth limited; receiving a chunk request from a client that is hosted on a user device; wherein the request is for obtaining chunk from the streaming media flow at a requested bit rate; sending to a media streamer the chunk request; receiving, from the media streamer, the requested bit rate version of the chunk; generating a new chunk, based on the allocated bit rate for the streaming flow; wherein the generating comprises performing a video aware omission of redundant information from at least one frame of the new chunk; and assisting in streaming to the client, the new chunk.

A system may be provided and may include an input interface, a processing module and an output interface. The input interface may be arranged to receive an allocated bit rate for a streaming media flow that comprises a plurality of chunks and is expected to flow over a last mile channel that is bandwidth limited. The processing module may be arranged to determine the allocated bit rate. The input interface may be arranged to receive a chunk request from a client that is hosted on a user device; wherein the request is for obtaining chunk from the streaming media flow at a requested bit rate; sending to a media streamer the chunk request. The input interface may be arranged to receive, from the media streamer, the requested bit rate version of the chunk. The processing module may be arranged to generate a new chunk, based on the allocated bit rate for the streaming flow; wherein the generating comprises performing a video aware omission of redundant information from at least one frame of the new chunk. The video aware omission is video aware in the sense that the omission of information is done based on video layer information. The output interface may be arranged to assist in streaming to the client, the new chunk.

The omission may include omitting redundant information from at least one frame of the first new chunk.

The redundant information may include stuffing bits.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
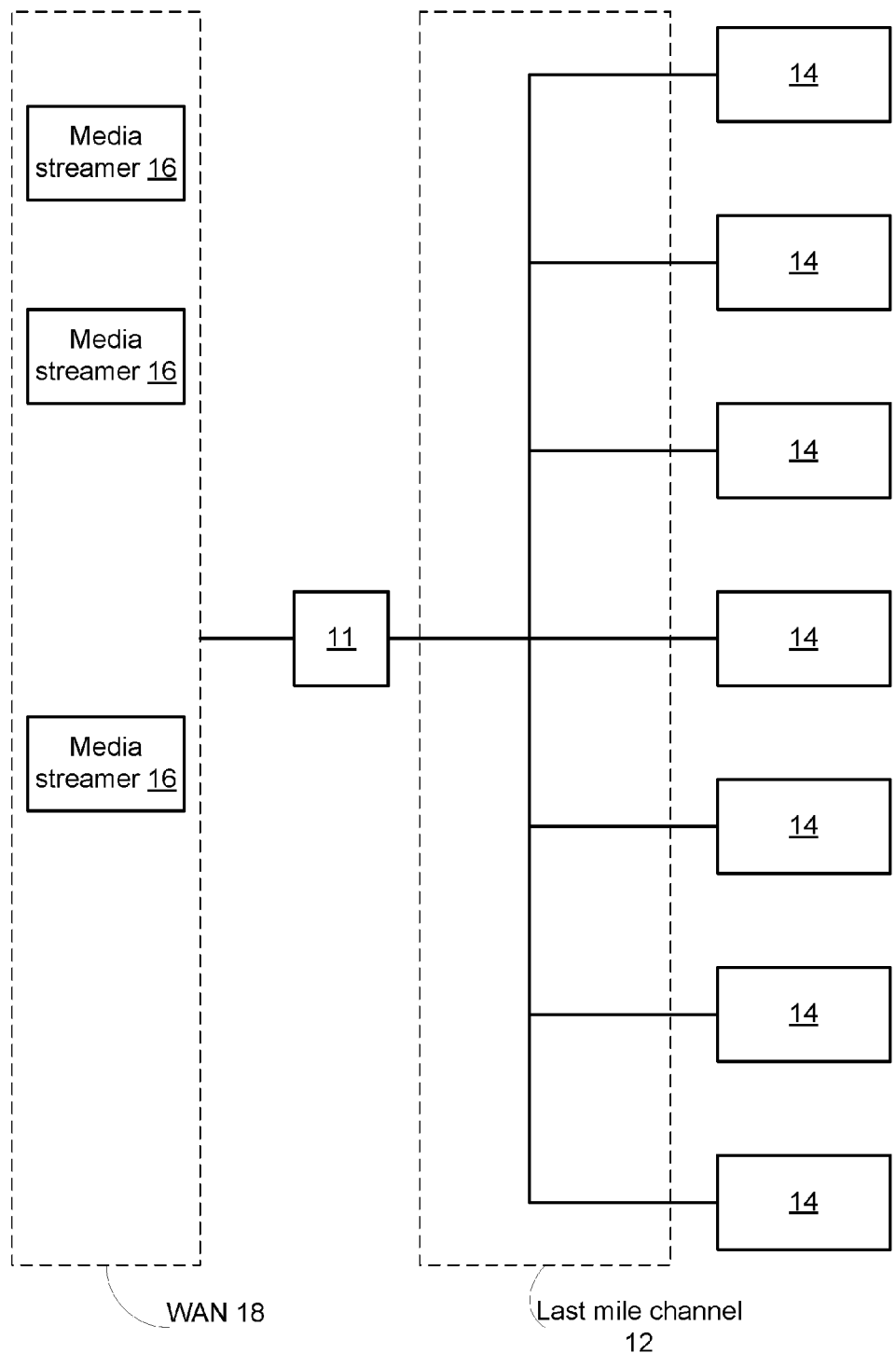
FIG. 1 illustrates a system and its environment according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "chunk request" is a request to receive a chunk of a streaming media flow. A streaming media flow is a media flow that is configured to be streamed by a media streamer. The chunk request may include a chunk identifier and bit rate information that indicates the desired bit rate of the requested chunk. The requested bit rate can be defined in an explicit manner (for example—the value of the requested bit rate can be included in the chunk request) or implicitly (for example—the chunk identifier may point to a certain version of the chunk—of a known bit rate). The chunk request can include a URL that is specific to a specific segment and a specific bit rate.

The term "media source" can mean an entity that provides chunks to the system or to clients. The media source can generate the chunks itself, can generate various version of chunks that differ from each other by their bit rate, can receive various versions of the chunks from another entity ad the like. The media source can be a media server.

A media source that is capable of streaming one or more streaming media flows is referred to as a media streamer.

The term "last mile" may have its regular meaning. For example, it may have the meaning defined by www.wikipedia.org: "The "last mile" or "last kilometer" is the last mile of delivering connectivity from a communications provider to a customer. The phrase is therefore often used by the telecommunications and cable television industries. The actual distance of this leg may be considerably more than a mile, especially in rural areas. It is typically seen as an expensive challenge because "fanning out" wires and cables is a considerable physical undertaking. Because the last mile of a network to the user is also the first mile from the user to the world in regards to sending data (such as uploading), the term "first mile" is sometimes used.

According to an embodiment of the invention a system is provided. It is connected between the Internet or any Wide Area Network (WAN) and the last mile channel. For convenience of explanation the following description will refer to a last mile channel although it is applicable to other types of infrastructures. The last mile channel can include links, communication lines or any kind of bandwidth limited resources.

According to various embodiments of the invention the allocation of bit rates can be responsive to at least one parameter out of media stream priority, client priority, video quality, service priority, priority assigned to different types of streaming, policies responsive to the timing of streaming, to the type of transmission (wired, wireless), and the like. For example—clients of higher priority may be allocated higher bit rates than others.

According to an embodiment of the invention the bit rate allocation is executed by a system that is coupled to the last mile channel. It is noted that the bit rate allocation can be executed by a plurality of systems—in a distributed, centralized or even hierarchical manner. A hierarchical system can include a top tier system arranged to allocate bit rates over a first bandwidth limited medium, while the lowest tier system can be arranged to determine the bit rate allocation over a plurality of last mile channels that may receive content (directly or indirectly) from the first bandwidth limited medium. Yet for another example—the hierarchical system can include a top tier system arranged to allocate bit rates over the last mile channel, while the lowest tier system can be arranged to determine the bit rate allocation over channels that are fed from the last mile channel—such as customer premises gateways and the like.

FIG. 1 illustrates a system 11 that is connected between a WAN (such as the Internet), last mile channel 12 and user devices that host clients 14. Multiple media streamers 16 can be coupled to the WAN or be included in the WAN.

According to various embodiments of the invention user devices host clients. The clients and, additionally or alternatively, the system may participate in the bit rate control of the bandwidth limited resource. It is noted that end user devices and the media streamer may not be aware of the state of the bandwidth limited resource and thus may request or allocate bit rates in sub-optimal manner, as illustrated for example in the background section of this patent application.

The system 11 may reside before a bandwidth limiting resource, or otherwise can be able to participate in the bit rate control of the bandwidth limited resource. The system may be a router, an aggregator, a switch, a controller, or a combination thereof. The system can include hardware, software firmware or a combination thereof.

According to an embodiment of the invention at least a part (for example—at least a majority) of the bit rate control is executed by the clients and these clients may be proxied at the system. Accordingly, the clients may collaborate to apply bit rate control and especially may apply a distributed media access control scheme that is mainly based upon an exchange of information between the different clients.

A client can send a chunk request to other clients and once approved by other clients—the system can pass to the media streamer the chunk request. The clients can collaborate while taking into account client priorities, request priorities, quality of service issues, previous chunk requests that were granted or declines as well as other factors.

A client can, by storing chunk requests from other clients (and also its own chunk requests), obtain at least a partial view of the state of the bandwidth limited resource. The system can also provide bit rate information such as but not limited to available bit rate, maximal allowed bit rate and the like.

The clients can approve, amend or reject a chunk request. The amendments may relate to the requested bit rate and not to the identity of the requested chunk.

Once a bit rate decision (bit rate allocation) is completed—the requesting client can be notified and according to the bit rate decisions—if approved send its own request to the media server or have the system send such a chunk request to the media server.

Thus, the clients can make a decision collaboratively and inform the clients that are allowed to send chunk requests—the allowed bit rate allocated for each client.

A client can, in response, generate a chunk request for a chunk known to the client and having a bit rate allocated as a result of the collaboration.

Yet according to another embodiment of the invention the system makes the bit rate decisions and notifies the clients which bit rates are allocated for the clients. A client, once receiving the allocated bit rate, can tailor its chunk request accordingly.

Yet according to another embodiment of the invention some clients can make bit rate decisions while other clients are not allowed to make such decisions. The selection of which clients can make such decisions can be determined based upon various criteria such as client priority, quality of service guaranteed to clients and the like. The selection can be fixed or change over time.

According to another embodiment of the invention the bit rate decisions are made by the system without notifying the clients about these decisions and especially not notifying the clients about the bit rate allocated for their requests.

For example, clients may send to the system chunk requests to obtain chunks. These chunk requests are received by the system. The system does not merely pass these chunk requests "as is" to the media streamer but rather can apply bit rate management control and send updated chunk requests to the media streamer.

The system may analyze the traffic on the bit rate limited resource and based upon the requests and the state of the bit rate limited resource generate new chunk requests, unchanged one or more chunk requests and the like.

A new chunk request can be generated by modifying or updating a chunk request or by creating a new chunk request with new or modified content.

The system then sends the chunk requests to a media streamer. Thus—the new chunk requests are for the visual content (segments of the stream) as the original chunk requests but may request different bitrate versions than those which were in the original requests.

These new chunk requests are sent to the media sources that in turn provide the chunks of a required bit rate to the clients—either via the system or while bypassing the system. If bypassing the system, the system should be aware of the transmissions over the bandwidth limited resource—it can monitor the traffic, and additionally or alternatively, can receive information from the media streamers about the transmitted traffic.

In any of the mentioned above embodiments the bit rate allocation between clients and additionally or alternatively, between services or flows, can be responsive to parameters such as: (i) video quality, (ii) user priority, (iii) operator priority, (iv) service (flow) priority; and (v) billing considerations.

Figure 2:
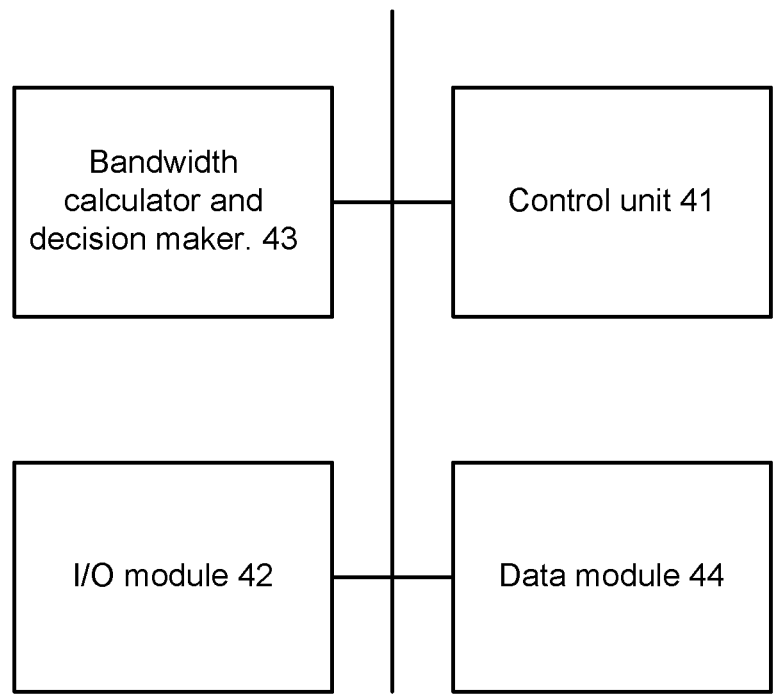
FIG. 2 illustrates a system according to an embodiment of the invention.

FIG. 2 illustrates a system 40 according to an embodiment of the invention. The system 40 includes:

a. An Input Output (I/O) module 42 that includes an input interface and an output interface. The I/O module 42 may be arranged to handle incoming and outgoing traffic including upstream chunk requests and downstream chunks.

b. A bandwidth calculator and decision maker (decision engine). The module 43 may be arranged to estimate the available bandwidth on the last mile channel and to make decisions regarding the amount of bit rate that can be allocated for each client. The decision engine can be a processing module or can be hosted by a processing module. The processing module can include hardware components.

c. A data module 44 that includes a parser that may create and parse relevant messages vis-à-vis the clients and the media streamers and d. A control unit 41 that allocates resources among the modules of the system 40 and controls timing and similar issues.

It should be noted that other implementations are also possible including ones that include a module to represent each client separately, memory units and many other possibilities. Decision making can be based on many different approaches including some mentioned below.

The system 40 resides on the network side of the last mile channel 12, and has a visibility to all the requirements from the last mile channel 12. Therefore, the combined requests (including chunk requests and data transfer requests) for bit rates from the media streamers can be planned so that the transmission of chunks and other flows do not exceed the available bit rate. This eliminates the problem of bit rate waste. In addition, the combined requests can be planned to fill the last mile channel as much as possible. This eliminates the problem of unused bit rate.

The system may be implemented within the architecture of any broadband provider such as mobile providers, HFC networks, DSL networks and any other type of network. In all cases, the system 40 may be implemented upstream from the client at the place that has full visibility of the bit rate limiting last mile channel.

Additionally or alternatively, the system may be implemented in a hierarchical fashion. For example, the system may be implemented in a residential gateway (or DSLAM) to manage different clients within the house and also in the Central Office to manage bit rates among different households.

It should be mentioned that the collaborative decisions can be achieved by one single process which manages all the client requests or by numerous processes, each one proxying one client, that negotiate among themselves.

Figure 3:
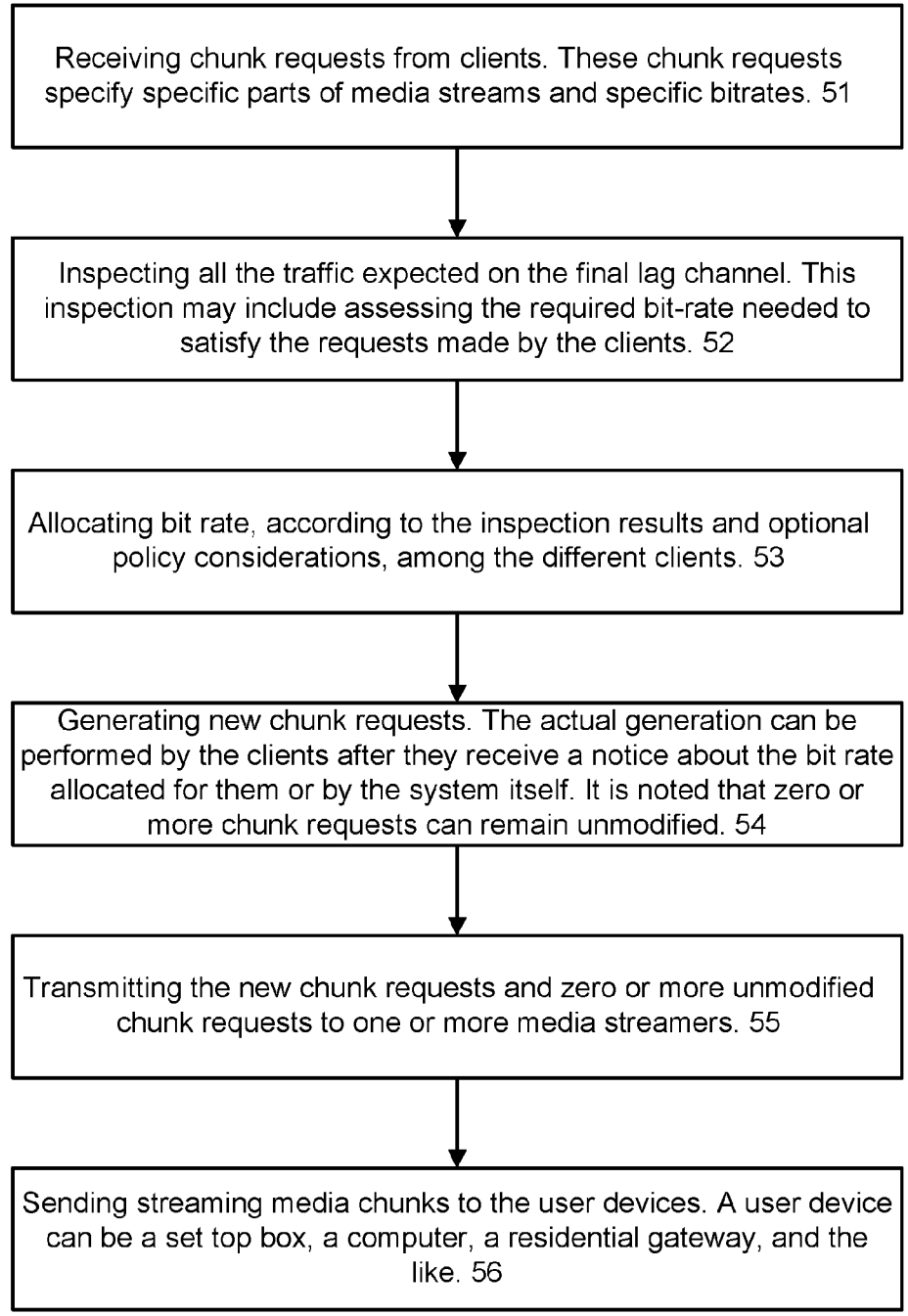
FIG. 3 illustrates a method according to an embodiment of the invention.

FIG. 3 illustrates method 50 according to an embodiment of the invention.

Method 50 starts by stage 51 of receiving chunk requests from clients. These chunk requests specify specific parts of media streams and specific bitrates.

Stage 51 is followed by stage 52 of inspecting all the traffic expected on the last mile channel. This inspection may include assessing the required bit-rate needed to satisfy the requests made by the clients.

Stage 52 is followed by stage 53 of allocating bit rate, according to the inspection results and optional policy considerations, among the different clients. The allocation should be as efficient as possible, taking into account all needed constraints (bit rate, cost, etc.). The allocation of bit rate includes indicating which bit rate version of a media stream should be provided to each client that generated an approved chunk request.

Stage 53 is followed by stage 54 of generating new chunk requests. The actual generation can be performed by the clients after they receive a notice about the bit rate allocated for them or by the system itself. It is noted that zero or more chunk requests can remain unmodified.

Stage 54 is followed by stage 55 of transmitting the new chunk requests and zero or more unmodified chunk requests to one or more media streamers.

Stage 55 may be followed by streaming the requested chunks to the user devices. This is reflected by stage 56 of sending streaming chunks to the user devices. A user device can be a mobile device, a set top box, a computer, a residential gateway, and the like.

Figure 4:
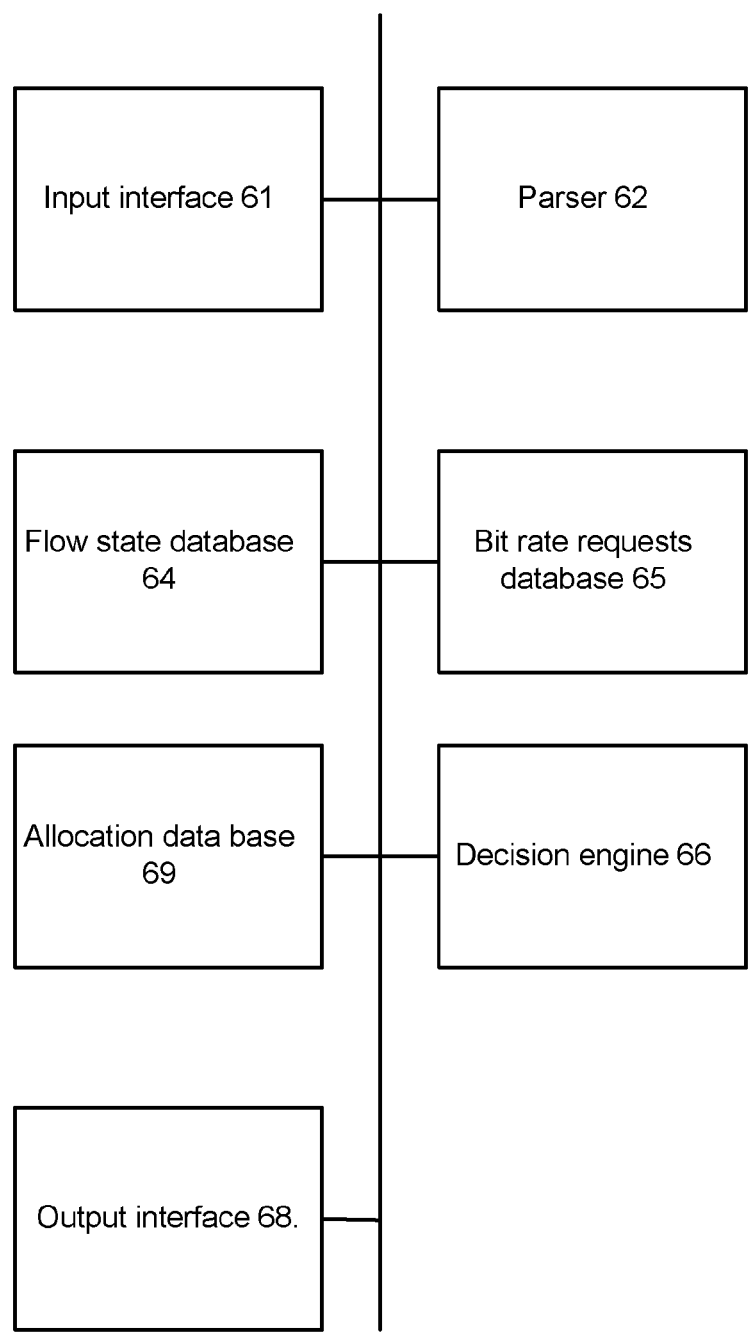
FIG. 4 illustrates a system according to an embodiment of the invention.

According to an embodiment of the invention a system 60 is provided. An embodiment of this system is illustrated in FIG. 4. The system receives information packets such as media packets that belong to chunks (media flows) and control packets. Some of the control packets include chunk requests.

For simplicity of explanation the following description will refer to media packets and to chunk requests.

The system 60 includes an input interface 61, a parser 62, a flow state database 64, a bit rate requests database 65, an allocation data base 69, a decision engine 66 and an output interface 68. The parser 62 parses incoming packets received by the input interface 60. Packets are classified as either control packets (such as chunk requests) or data packets (such as media packets).

Media packets or information representing media packets are used to update the flow state database 64. Control packets such as chunk requests or information representing the control packets are used to update the bit rate requests database 65. Both databases 64 and 65 provide a view of the bit rate utilization of the last mile channel and of requested bit rate for chunk requests—fulfilled chunk requests and those which were rejected or otherwise not fulfilled.

The allocation data base 69 stores the allocation of bit rates.

The decision engine 66 can access all databases and apply a bit rate control policy. It can, for example, generate new chunk requests that include fewer or more bit rate than requested by the client, and the like. According to another embodiment of the invention the decision engine 66 re-allocates bit rates and another entity amends the chunk requests based on the amended bit rate allocations. The decision engine can be a processing module or be hosted by a processing module.

According to an embodiment of the invention the flow state database 64 is used to track all the flows in last mile channel, track the utilization, identify related flows, such as consecutive segments of an ABR stream, identify significant changes in the state of the media flows that warrant a notification of the decision engine. Consecutive segments of an ABR stream can be the subject of different chunk requests that are sent by the same client. The client can send one or more chunk requests related to one or more chunks even before the client received one or more previously requested chunks, If these different chunk requests are both identified as being associated to the same media stream then the bit rate allocation can take this into account when comparing requested bit rates and allocated bit rates.

The decision engine 66 can be activated when pre-defined conditions are fulfilled such as more than a pre-defined change in the utilized bit rate, more than a pre-defined amount of newly requested bit rates, and the like. Alternatively, every chunk requests can be sent to the decision engine 66.

The decision engine 66 may allocate bit rates for flows and especially to chunks.

According to an embodiment of the invention the decision engine 66 can distinguish between Adaptive Bit Rate (ABR) flows and Progressive Download (PD) flows. It can allocate to each of these types of streaming media flows its own aggregate bit rate and apply the same bit rate control policy for both or apply different bit rate control policies for each.

In various streaming techniques the client is provided with chunks even before it starts viewing these chunks. This may prevent media viewing problems when the client is temporarily prevented from receiving the media or when the streaming to the client is otherwise limited due to various reasons. In case that the client decides not to view these chunks, their transmission over the last mile channel results in a waste of bandwidth. In order to prevent this waste, the decision controller may delay the transmission of media packets from the media streamer. This can be done by delaying acknowledgement messages sent from the client (towards the media streamer) indicative of a reception of such packets. This policy can be applied, for example, on ABR chunks.

According to various embodiments of the invention the decision engine 66 can limit the amount of chunks that are downloaded to a client so that if the client ends viewing a media stream before viewing all the chunks that were downloaded to it—less chunks will be wasted. The limitation can include delaying a transmission of acknowledgment messages to a media streamer, delaying a transmission of chunk requests and the like.

Figure 5:
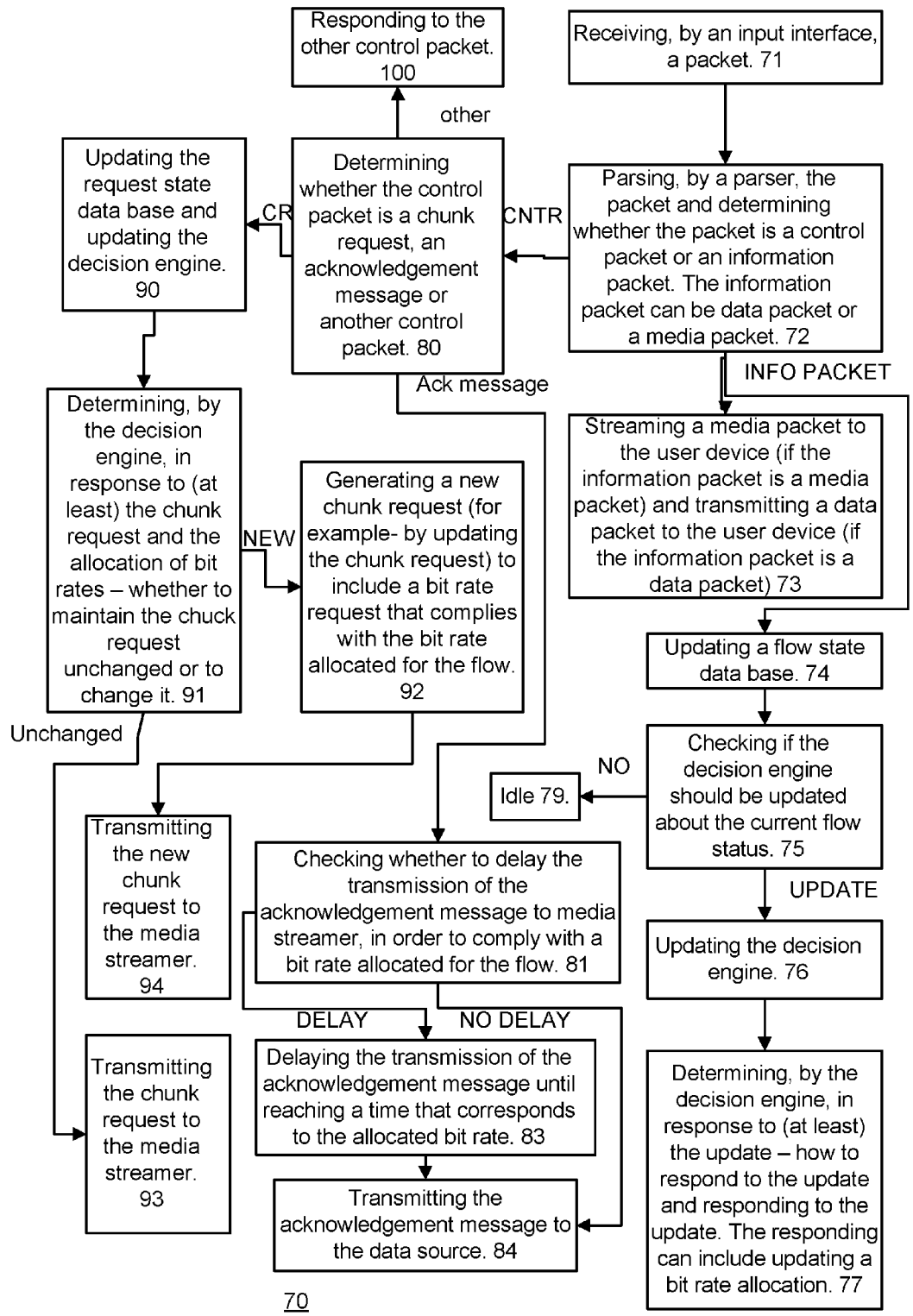
FIG. 5 illustrates a method according to an embodiment of the invention.

FIG. 5 illustrates method 70 for enforcing a bit rate allocation according to an embodiment of the invention.

Method 70 starts by stage 71 of receiving, by an input interface, a packet.

Stage 71 is followed by stage 72.

Stage 72 includes parsing, by a parser, the packet and determining whether the packet is a control packet or an information packet. The information packet can be data packet or a media packet.

If the packet is an information packet (INFO PACKET) then stage 72 is followed by stages 73 and 74.

If the packet is a control packet (CNTR) then stage 72 is followed by stage 80.

Stage 73 includes streaming a media packet to the user device (if the information packet is a media packet) and transmitting a data packet to the user device (if the information packet is a data packet). It is noted that according to some embodiments of the invention method 70 only addresses upstream traffic and does not participate in the downstream data path so that stage 73 may not be included in method 70.

Stage 74 includes updating a flow state data base. Thus the flow state data base may be updated to reflect the actual bit rate utilization.

Stage 74 may be followed by stage 75 of checking if the decision engine should be updated about the current flow status.

If the answer is positive (UPDATE) stage 74 is followed by stage 76, else (NO) stage 74 can jump to an idle stage 79.

The checking of stage 75 can include applying predefined conditions to this updating in order to provide a tradeoff between too many updates (that may consume too many computerized resources or communication resources) and fewer than desired updates (that may result in sub-optimal allocation of bit rate). For example—the decision engine can be update per predefined period, per predefined amount of change in requested or utilized bit-rates, when a new user is added, when a new flow is added, when a user leaves or when a flow is terminated.

Stage 76 includes updating the decision engine.

Stage 76 is followed by stage 77 of determining, by the decision engine, in response to (at least) the update—how to respond to the update and responding to the update. The responding can include updating a bit rate allocation.

Stage 80 includes determining whether the control packet is a chunk request (CR), an acknowledgement message (Ack message) or another control packet (other).

If the control packet is an acknowledgement message then stage 80 is followed by stage 81.

If the control packet is a chunk request then stage 80 is followed by stage 90.

Else (another control packet) stage 80 is followed by stage 100 of responding to the other control packet.

Stage 81 includes checking whether to delay the transmission of the acknowledgement message to media streamer, in order to comply with a bit rate allocated for the flow. Delay may be required if the allocated bit rate mandates a certain period (or a certain range of periods) between consecutive transmissions of acknowledgement messages.

If the answer is positive (DELAY) then stage 81 is followed by stage 83 of delaying the transmission of the acknowledgement message until reaching a time that corresponds to the allocated bit rate. The period between consecutive transmissions of acknowledgement messages may reflect the allocated bit rate. If, for example, each acknowledgment message is followed by a streaming of X bits and the allocation of bit rate is Y bits per second than the delay can be substantially equal to X/Y seconds. If the answer is negative (NO DELAY) than stage 81 is followed by stage 84.

Stage 83 is followed by stage 84 of transmitting the acknowledgement message to the data source.

Stage 81 and 83 can be executed by a protocol manipulator (such as a HTTP manipulator) that may access the decision engine or the allocation data base and determine the allocated bit rate for the flow that is related to the acknowledgement message.

Stage 90 includes updating the request state data base and updating the decision engine.

Stage 90 is followed by stage 91 of determining, by the decision engine, in response to (at least) the chunk request and the allocation of bit rates—whether to maintain the chunk request unchanged or to change it. If determining to update the chunk request (NEW) then stage 91 is followed by stage 92 else (Unchanged) it is followed by stage 93 of transmitting the chunk request to a media streamer. The determination can include comparing between the bit rate requested by the chunk request and the allocated bit rate. If, for example, the allocated bit rate matches the requested but rate then the chunk request can remain unchanged. If there is a mismatch between the allocated bit rate and the requested bit rate (Requested by the chunk request) then the decision engine can determine to adapt the requested bit rate to the allocated bit rate. It is noted that decision engine may ignore small (insignificant) changes.

Stage 92 includes generating a new chunk request (for example—by updating the chunk request) to include a bit rate request that complies with the bit rate allocated for the flow.

Stage 92 is followed by stage 94 of transmitting the new chunk request to the media streamer.

A non-limiting example of a bit rate control policy is provided below:

A maximal allowable aggregate bit rate for transmitting video chunks (or all types) is defined—$T_{BR}$.

A maximal allowable bit rate for high priority users ($PU_{BR}$) may be defined.

A maximal allowable aggregate bit rate for transmission of PD chunks and ABR chunks are defined—$PD_{BR}$ and $ABR_{BR}$.

The maximal allowable aggregate bits rates for each type of media can be a fraction of $TABR_{max}$. For example $ABR_{BR}$ can equal 80% of $TABR_{max}$. ABR manifest files include a description all the possible bit rates for a stream. $TABR_{max}$ is the sum of the possible maximums of the available streams.

After allocating bit rates for chunks, the remaining bit rate for data transmission ($D_{BR}$) can be calculated by:

$$D_{BR}=(T_{BR}-PU_{BR}-PD_{BR}-ABR_{BR})*\text{Factor}$$

The Factor is used to maintain some threshold below congestion.

Different bit rates can be allocated for different data flows although different data flows can be allocated the same bit rate. In the latter case—each data flow can be allocated with $F_{BR}=(D_{BR}/\text{number of data flows})$.

According to an embodiment of the invention the bit rate allocation parameters (bit rates, factor) can be re-calculated when at least one of the following events occurs:
a. New flows
b. Closing of flows
c. Change of reception conditions
d. Anticipation of events (hand-ins, hand-outs, etc.).

The following tables will illustrate an example of a bit rate control scheme.

Tables 1 and 2 illustrate an initial state of the system and bit rate allocations for different users.

TABLE 1

| Maximal allowable aggregate bit rate | $PD_{BR}$ | Number of PD flows | $ABR_{BR}$ | Number of ABR flows | Number of data flows |
|---|---|---|---|---|---|
| 4500 kbps | 800 kbps | 1 | 2100 kbps | 3 | 6 |

TABLE 2

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 400 |
| User D | Flow 4 | ABR | 850 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |

At this initial state user F sends an acknowledgement message for a media packet of flow 7 he receives. The system may delay the transmission of the acknowledgement message in order to maintain the bit rate allocation—to 250 kbps.

After a while user B sends an acknowledgement message for a media packet of flow 2 he receives. The system may delay the transmission of the acknowledgement message in order to maintain the bit rate allocation—to 800 kbps.

After those events the decision engine decided to change the allocation of bit rates for users D and C—the bit rate allocation to flow 4 of user D is reduced from 850 kpbs to 400 kbps and to increase the bit rate allocation of flow 3 of user C from 400 to 850 kbps. The decision can be responsive to various reasons including but not limited to quality issues.

This change may include first reducing the bit rate allocation to user D and then increasing the bit rate allocation of user C. This order may prevent congestion. It is noted that if there is no risk of congestion (for example—when the order of the increment and decrement of bit rates will not cause congestions)—then the order can be reversed.

Table 3 illustrates this new state:

TABLE 3

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 850 |
| User D | Flow 4 | ABR | 400 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |

After a while user D sends a chunk request and the system changes the bit rate associated with the video chunk to 400 bps—if the request (prior the change of bit rate allocation) requested more than 400 bps.

After a while user C sends a chunk request and the system changes the bit rate associated with the video chunk to 850 bps—if the request (prior the change of bit rate allocation) requested less than 850 bps (or more than 850 bps).

After a while a new user is added—user J and a new flow (flow 11) is also added. This will result in a change in both status tables, as illustrated by tables 4 and 5:

TABLE 4

| Maximal allowable aggregate bit rate | $PD_{BR}$ | Number of PD flows | $ABR_{BR}$ | Number of ABR flows | Number of data flows |
|---|---|---|---|---|---|
| 4500 kbps | 800 kbps | 1 | 2800 kbps | 4 | 6 |

TABLE 5

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 850 |
| User D | Flow 4 | ABR | 400 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |
| User J | Flow 11 | ABR | 400 |

Although the ABR for User J is 850 kbps—only 700 kbps were added to ABRbr of table 4 according to TABRmax. Only 400 kpbs were allocated for flow 11 (in table 5) because in the example, the manifest stated that the next (after 400 kbps) bitrate level is 850 kbps and this may be too high.

After a while user J sends a chunk request for flow 11 and the system changes the bit rate associated with the video chunk to 400 bps—if the request (prior the change of bit rate allocation) requested more than 850 bps.

After a while user A sends an acknowledgement message for data flow 1 he receives. The system may delay the transmission of the acknowledgement message in order to maintain the bit rate allocation—to 150 kbps.

Figure 6:
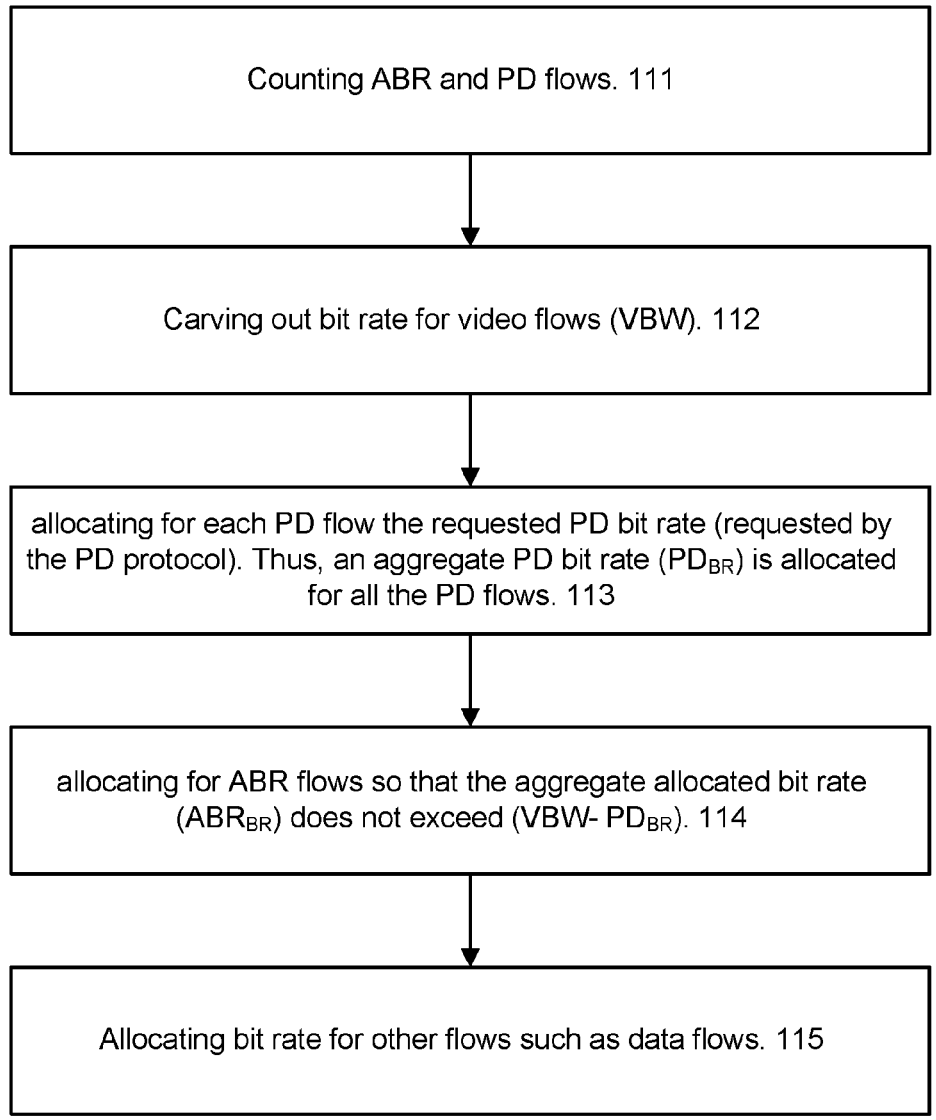
FIG. 6 illustrates a method according to an embodiment of the invention.

FIG. 6 illustrates method 110 for bit rate allocation according to an embodiment of the invention.

Method 110 includes a sequence of stages 111, 112, 113, 114 and 115.

Stage 111 includes counting ABR and PD flows.

Stage 112 includes carving out bit rate for video flows (VBW).

Stage 113 includes allocating to each PD flow the requested PD bit rate (requested by the PD protocol). Thus, an aggregate PD bit rate ($PD_{BR}$) is allocated for all the PD flows.

Stage 114 includes allocating to ABR flows so that the aggregate allocated bit rate ($ABR_{BR}$) does not exceed (VBW−$PD_{BR}$). The allocation between different ABR flows can be responsive to quality considerations—lower quality flows can receive more bit rate.

Stage 115 includes allocating bit rates for other flows such as data flows.

According to an embodiment of the invention method 110 also includes an initialization stage 119 that include allocating bit rate for premium users. Stage 119 may precede stage 111.

According to an embodiment of the invention the control packets do not include chunk requests or acknowledgement messages but rather include commands that relate to other network functions and the chunk requests and acknowledgement messages can be categorized to information packets. In this case the mentioned above methods and system should classify information packets to a plurality of classes—including acknowledgement messages and chunk requests and process these requests as mentioned above. A non-limiting example of a network that perform a different classification may include a wireless network in which control signals can include requests to perform a handoff between cells, and the like.

Allocation of Bit Rates that Differ from Requested Bit Rates

The media streamer can store different bit rate versions of the same content. The different bit rates may be selected out of a finite group of bit rates. As indicated above, the clients can request chunks having bit rates taken from this finite group of bit rates. Alternatively, the clients can be allowed to request bit rates of only a sub-set of this finite group of bit rates. Tables 1-4 provide example of a finite group of bit rates that may include only 250 kpbs, 400 kbps, 800 kbps and 850 kbps. The mentioned below systems, methods and computer program products can provide a much larger number of bit rates. For example, given the mentioned above finite group of bit rates, almost any bit rate can be provided that ranges between 250 kbps (lowest bit rate of the finite group of bit rates) and 850 kbps (the highest bit rate of the finite group of bit rates).

According to various embodiments of the invention the clients can be provided with streaming media flows that have an effective bit rate that may differ from those included in the finite group of bit rates. The number of possible effective bit rates exceeds the number of bit rates of the finite group of bit rates and thus facilitates a more effective but rate allocation scheme.

According to an embodiment of the invention bit rate allocated for a client can be lower than a requested bit rate (requested by the client) by removing excessive (redundant) information from chunks.

According to an embodiment of the invention bit rate allocated for a client can be lower than a requested bit rate (requested by the client) by removing media frames from the chunks.

Yet according to another embodiment of the invention the bit rate allocated for a client can differ from the requested bit rate (requested by the client) by multiplexing frames from different bit rate versions of the media chunks.

Discarding Excessive Data

It often happens that media flows of constant bit rate (CBR) include excessive data which does not contribute in any way to the decoding process of the data. This data is usually used for "stuffing" and appears in the streamed media flow in order to maintain the constant bit rate. This excessive data, (which in some cases may be known as "stuffing bits" or "null packets") can be discarded (before transmitting the streaming media flow to the client over the bandwidth limited link) if there is a need to reduce the bit rate allocated for the client and it is not necessary to maintain the constant bit rate over the bandwidth limited link (the last mile).

In many cases, especially where the streaming media flow is transmitted over a communication system that has substantial buffers (an IP network is assumed to have substantial buffers) the timing information of the streaming media flow, even after omitting excessive data, may be maintained.

In some cases, some timing information which is embedded within the streaming media flow may be modified when this data is discarded in order to maintain legality of the stream. Timing information which can include a presentation timestamp, a decoding time stamp, or a program counter reference can be changed, but this is not necessarily so. Those of skill in the art can apply any of the well known methods for timing information amendments.

Discarding Specific Elements from the Streaming Media Flow

In some cases, especially when bandwidth is scarce, it is possible to discard specific elements from the streaming media flow. An example is to discard non-reference frames from the streaming media flow. A non-reference frame is a frame that is not needed for decoding any other frames of the streaming media flow.

It is expected that omitting non-reference frames will no affect other frames of the streaming media flow and thus the penalty resulting from their omission is relatively small—and especially smaller than the penalty resulting from omitting a reference frame.

In many cases, especially where the streaming media flow is transmitted over a communication system that has substantial buffers (an IP network is assumed to have substantial buffers) the timing information of the streaming media flow, even after omitting specific elements, may be maintained.

In some cases, some timing information which is embedded within the streaming media flow may be modified when this data is discarded in order to maintain legality of the stream. Timing information can include a presentation timestamp, a decoding time stamp or a program counter reference can be changed, but this is not necessarily so. Those of skill in the art can apply any of the well known methods for timing information amendments.

Dithering Between Different Bit Rate Versions

A media streamer usually stores multiple bit rate versions of the same content. These versions have bit rates selected from the finite group of bit rates.

These versions can be used to create new chunks of the streaming media flows by picking parts (for example—frames) of different chunks that represent the same content but of different bit rates. These new chunks can have an interim bit rate.

The generation of such a new chunk can be facilitated if the different chunks that are used form generating the new chunk have the same internal coding structure—such as the same Group Of Picture (GOP) structure or the same resolution.

For example, assuming that a media streamer holds chunks of streaming media flows that differ from each other by bit rate—one has a bit rate of BR1 and the other as a bit rate of BR2 where BR1<BR2.

According to an embodiment of the invention a device can request from the media streamer two fragments, one at BR1 and one at BR2 that hold the same (encoded) content. If the two fragments are encoded at the same structure, the device can select an element, for example a frame, from one of the versions and then the next frame from the other version.

The decision of which frame to select would depend on different conditions such as the desired bit rate and also on characteristics of the stream such as frame type. The resulting newly composed version (new chunk) would have a bit rate BR3 which fulfils BR1<BR3<BR2. The actual value of BR3 would depend on how many elements would be taken from each version. Depending on the number of elements that can be chosen, the resulting bit rate can have many different values as desired.

As a approximation, the bit rate of a new chunk BR_A equals an average bit rate of the frames that are included in the new chunk. If, for example, there are two bit rates BR1 and BR2 and a chunk may include N frames, N1 frame of BR1 and N2 frames of BR2 then $BR\_A=(N1*BR1+N2*BR2)/N$.

Figure 7:
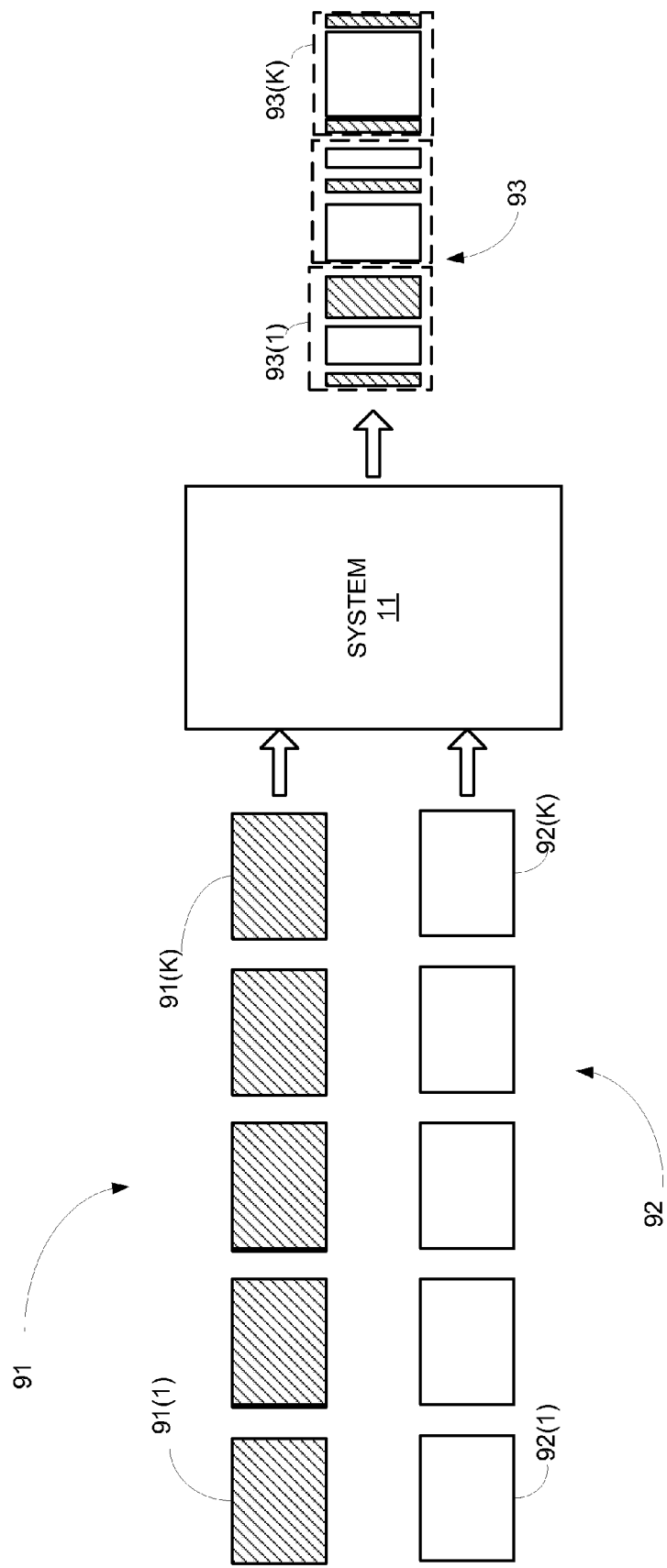
FIG. 7 illustrates a first sequence of chunks of a first bit rate, a second sequence of chunks of a second bit rate and a sequence of new chunks of an intermediate bit rate, according to an embodiment of the invention.

FIG. 7 illustrates a first sequence 91 of chunks 91(1)-91(K) of a first bit rate, a second sequence 92 of chunks 92(1)-92(K) of a second bit rate and a sequence 93 of new chunks 93(1)-93(3) of an intermediate bit rate, according to an embodiment of the invention. The new chunks may include combinations of frames from the different sequences of chunks.

Each of these chunks may include multiple frames. Thus, per chunk (or per multiple frames, system 11 can determine which bit rate version of a frame (out of a BR1 and BR2 versions) of the frames should be sent to the client—and virtually belong to a new chunk.

It is noted that if a frame is split between multiple chunks then the system 11 can aggregate frame portions of different chunks before sending the frame to the client.

The systems, methods and computer program produces disclosed in this specification require much less resources than other solutions. The bit rate control schemes may not require decoding of the chunks (or chunk content), processing the decoded chunks and then encoding them—thus they are simpler and more cost effective than such encoding based solutions.

The systems, methods and computer program produces disclosed in this specification may rely on existing bit rate versions of the streaming media flows and do not create new encoding generations. Additionally, the achieved bit rate reach practically any value desired. Also, the mechanism which selects the elements from the different versions can react fast to changing bandwidth constraints and adjust the created new chunks accordingly.

Figure 8:
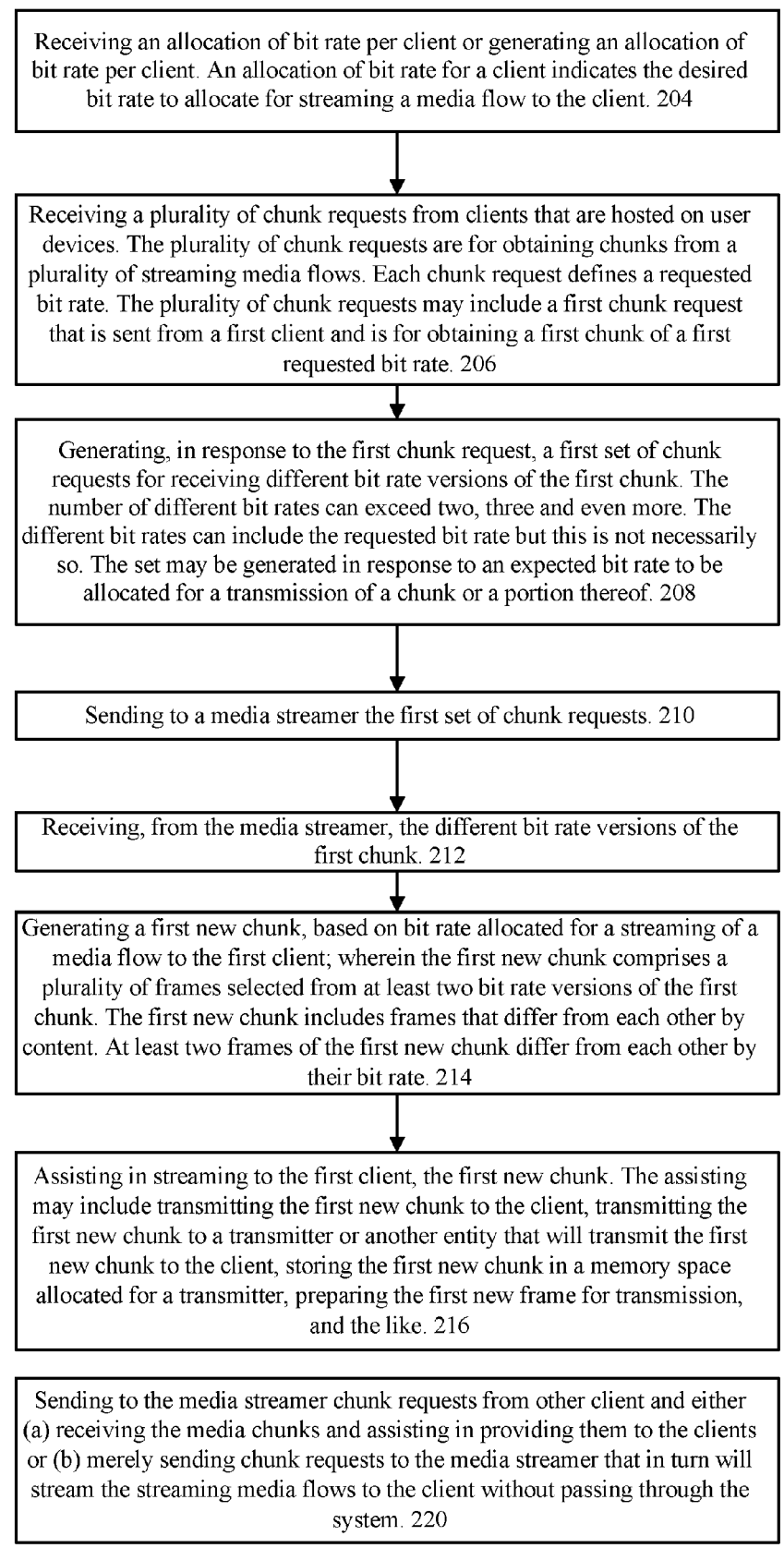
FIG. 8 illustrates a method according to an embodiment of the invention.

FIG. 8 illustrates method 200 for streaming media flow management, according to an embodiment of the invention.

For simplicity of explanation it is assumed that the one of the clients (referred to as a first client) receives a first streaming flow of a bit rate that differs from the bit rates that can be provided by the media streamer. It is noted that the method 200 can be applied to a provisioning of multiple streaming media flows (of bit rates that differ from those provided by the media server) to multiple clients. The generation of such media streams is responsive to a bit rate allocation scheme that can allocate bit rates that differ from those available by the media streamer.

Method 200 can start by stage 204 of receiving an allocation of bit rate per client or generating an allocation of bit rate per client. An allocation of bit rate for a client indicates the desired bit rate to allocate for streaming a media flow to the client.

Stage 204 is followed by stage 206 of receiving a plurality of chunk requests from clients that are hosted on user devices. The plurality of chunk requests are for obtaining chunks from a plurality of streaming media flows. Each chunk request defines a requested bit rate. The plurality of chunk requests may include a first chunk request that is sent from a first client and is for obtaining a first chunk of a first requested bit rate.

Stage 206 is followed by stage 208 of generating, in response to the first chunk request, a first set of chunk requests for receiving different bit rate versions of the first chunk. The number of different bit rates can exceed two, three and even more. The different bit rates can include the requested bit rate but this is not necessarily so. The set may be generated in response to an expected bit rate to be allocated for a transmission of a chunk or a portion thereof.

Stage 208 may include at least one of:

a. Generating the first set of chunk requests for receiving different bit rate versions of the first chunk, so that the set of different bit rate versions may include the first requested bit rate, at least one bit rate that is higher than the first requested bit rate and at least one bit rate that is lower than the requested bit rate.

b. Generating the first set of chunk requests for receiving different bit rate versions of the first chunk, so that the set of different bit rate versions may include the first requested bit rate, at least one bit rate that is higher than the first requested bit rate and no bit rate that is lower than the first requested bit rate.

c. Generating the first set of chunk requests for receiving different bit rate versions of the first chunk, so that the set of different bit rate versions may include the first requested bit rate, at least one bit rate that is lower than the first requested bit rate and no bit rate that is higher than the first requested bit rate.

Stage 208 is followed by stage 210 of sending to a media streamer the first set of chunk requests.

Stage 210 is followed by stage 212 of receiving, from the media streamer, the different bit rate versions of the first chunk.

Stage 212 is followed by stage 214 of generating a first new chunk, based on bit rate allocated for a streaming of a media flow to the first client; wherein the first new chunk comprises a plurality of frames selected from at least two bit rate versions of the first chunk. The first new chunk may include frames that differ from each other by content. At least two frames of the first new chunk differ from each other by their bit rate.

Stage 214 may include (a) generating the first new chunk so that the first new media chunk may include at least one frame of the first requested bit rate and at least one frame of an additional bit rate that differs from the requested bit rate, (b) generating the first new chunk so that the first new media chunk does not include any frame of the first requested bit rate.

Stage 214 is followed by stage 216 of assisting in streaming to the first client, the first new chunk. The assisting may include transmitting the first new chunk to the client, transmitting the first new chunk to a transmitter or another entity that will transmit the first new chunk to the client, storing the first new chunk in a memory space allocated for a transmitter, preparing the first new frame for transmission, and the like.

Method 200 may also include sending (220) to the media streamer chunk requests from other client and either (a) receiving the media chunks and assisting in providing them to the clients or (b) merely sending chunk requests to the media streamer that in turn will stream the streaming media flows to the client without passing through the system.

Figure 9:
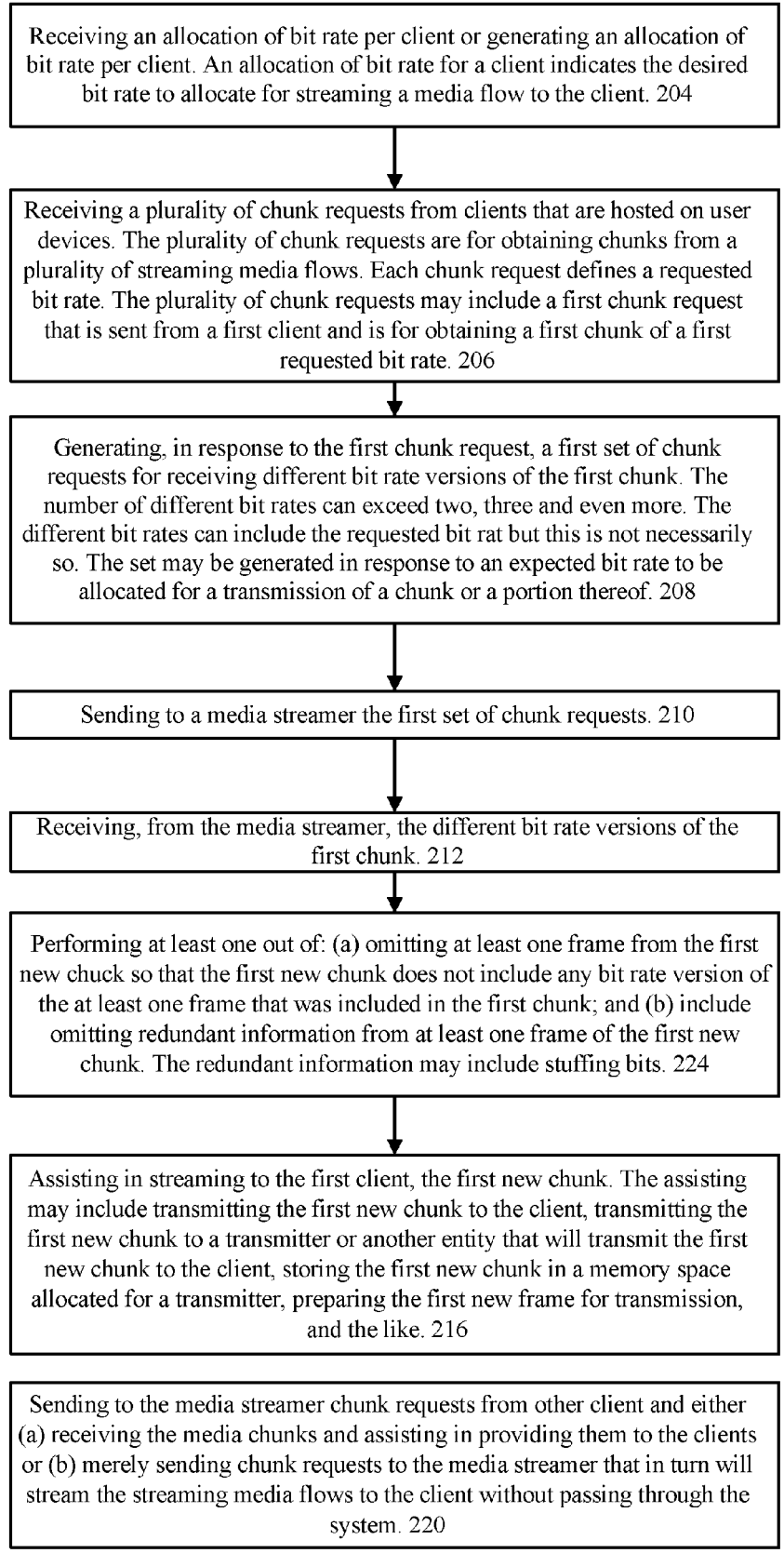
FIG. 9 illustrates a method according to an embodiment of the invention.

FIG. 9 illustrates method 220 for streaming media flow management, according to an embodiment of the invention.

Method 220 differs from method 200 by including stage 224 instead of stage 214.

Stage 224 differs from stage 214 by including at least one out of: (a) omitting at least one frame from the first new chuck so that the first new chunk does not include any bit rate version of the at least one frame that was included in the first chunk; and (b) include omitting redundant information from at least one frame of the first new chunk. The redundant information may include stuffing bits.

Stage 224 can also include any of the operations included in stage 214.

Figure 10:
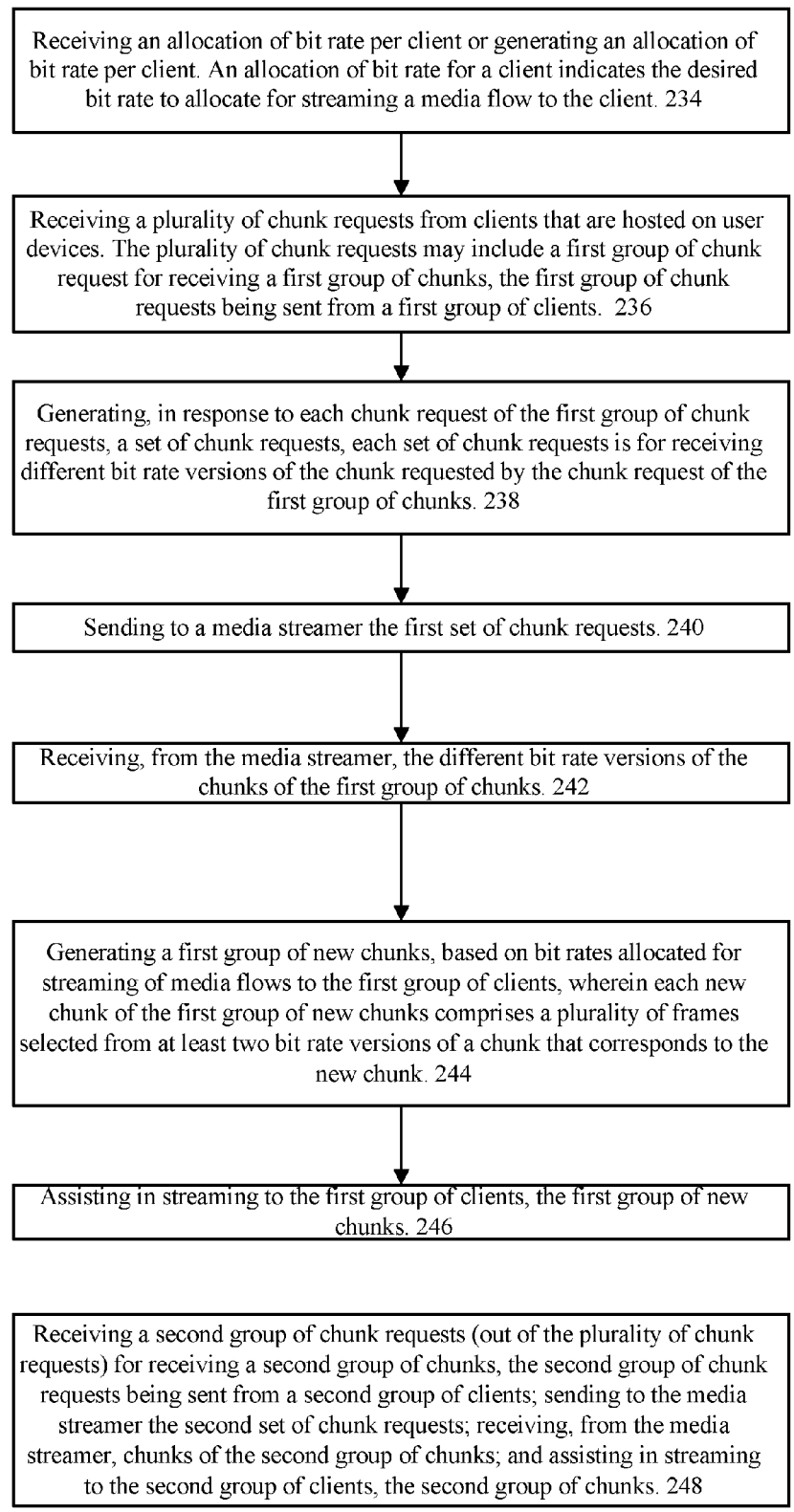
FIG. 10 illustrates a method according to an embodiment of the invention.

FIG. 10 illustrates method 230 for streaming media flow management, according to an embodiment of the invention.

Method 230 can start by stage 234 of receiving an allocation of bit rate per client or generating an allocation of bit rate per client. An allocation of bit rate for a client indicates the desired bit rate to allocate for streaming a media flow to the client.

Stage 234 is followed by stage 236 of receiving a plurality of chunk requests from clients that are hosted on user devices. The plurality of chunk requests may include a first group of chunk request for receiving a first group of chunks, the first group of chunk requests being sent from a first group of clients. The identity of clients that are included in the first group of clients may change over time. In generate the first group of clients include clients that their chunk requests are converted to sets of chunk requests.

Stage 236 is followed by stage 238 of generating, in response to each chunk request of the first group of chunk requests, a set of chunk requests; each set of chunk requests is for receiving different bit rate versions of the chunk requested by the chunk request of the first group of chunks.

Stage 238 is followed by stage 240 of sending to a media streamer the first set of chunk requests.

Stage 240 is followed by stage 242 of receiving, from the media streamer, the different bit rate versions of the chunks of the first group of chunks.

Stage 242 is followed by stage 244 of generating a first group of new chunks, based on bit rates allocated for streaming of media flows to the first group of the clients, wherein each new chunk of the first group of new chunks comprises a plurality of frames selected from at least two bit rate versions of a chunk that corresponds to the new chunk.

Stage 244 is followed by stage 246 of assisting in streaming to the first group of clients, the first group of new chunks.

Method 230 may also include (stage 248) of receiving a second group of chunk requests (out of the plurality of chunk requests) for receiving a second group of chunks, the second group of chunk requests being sent from a second group of clients; sending to the media streamer the second set of chunk requests; receiving, from the media streamer, chunks of the second group of chunks; and assisting in streaming to the second group of clients, the second group of chunks.

Figure 11:
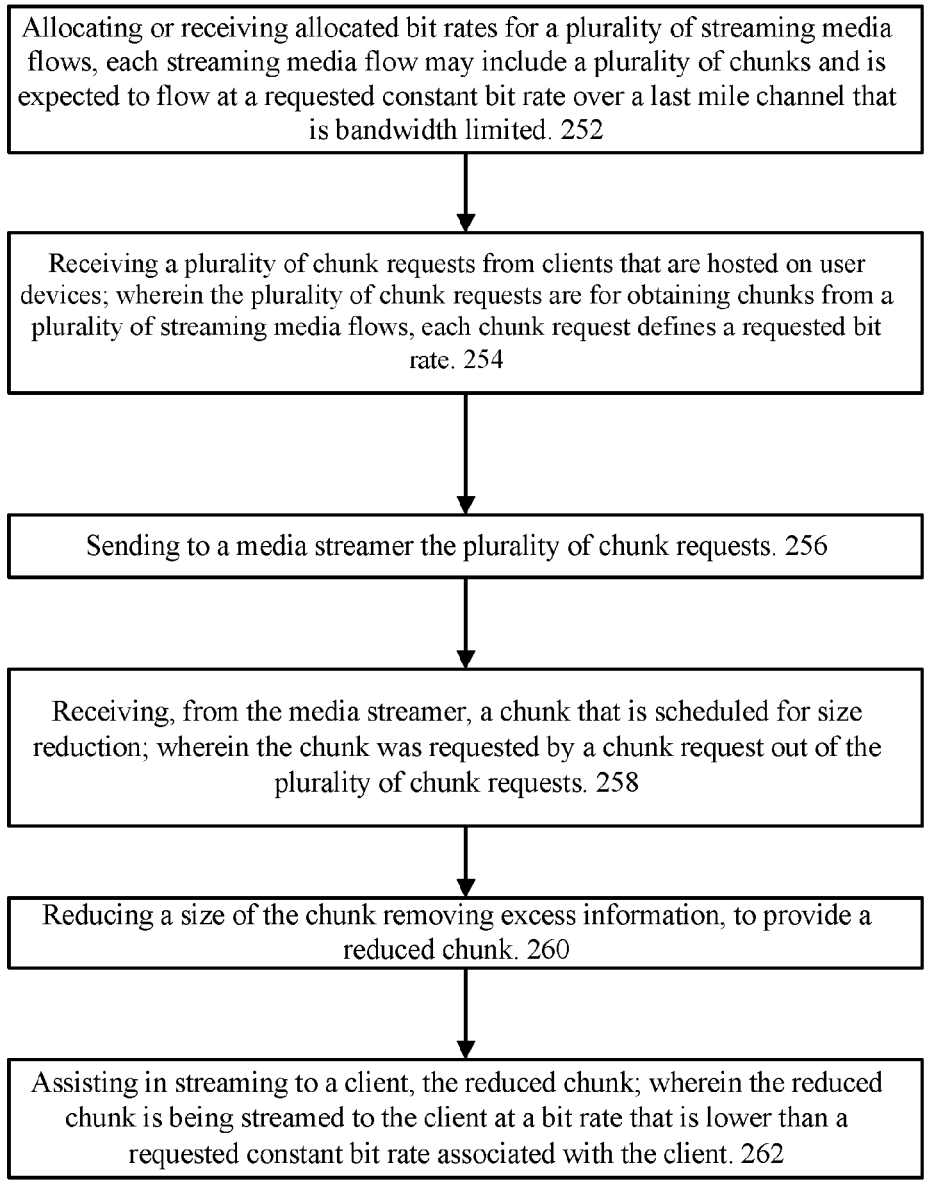
FIG. 11 illustrates a method according to an embodiment of the invention.

FIG. 11 illustrates method 250 according to an embodiment of the invention.

Method 250 may include stage 252 of allocating or receiving allocated bit rates for a plurality of streaming media flows, each streaming media flow may include a plurality of chunks and is expected to flow at a requested constant bit rate over a last mile channel that is bandwidth limited.

Stage 252 may be followed by stage 254 of receiving a plurality of chunk requests from clients that are hosted on user devices; wherein the plurality of chunk requests are for obtaining chunks from a plurality of streaming media flows, each chunk request defines a requested bit rate.

Stage 254 may be followed by stage 256 of sending to a media streamer the plurality of chunk requests.

Stage 256 may be followed by stage 258 of receiving, from the media streamer, a chunk that is scheduled for size reduction; wherein the chunk was requested by a chunk request out of the plurality of chunk requests.

Stage 258 may be followed by stage 260 of reducing a size of the chunk removing excess information, to provide a reduced chunk.

Stage 260 may be followed by stage 262 of assisting in streaming to a client, the reduced chunk; wherein the reduced chunk is being streamed to the client at a bit rate that is lower than a requested constant bit rate associated with the client.

It is noted that the media chunks that were requested by the plurality of chunk requests but were not scheduled for size reduction can be provided by the media streamed with or without the assistance of the system that executed method 250.

Stage 260 may include omitting a frame of the chunk. The frame can be a non-reference frame.

Stage 260 may include omitting excessive information included in at least one frame of the chunk.

Any of the methods mentioned in this specification can be combined for each other. For example, method 200 and method 220 may include changing a second chunk request to comply with an allocated bit rate, if a requested bit rate associated with the second chunk does not comply with the allocated bit rate, to provide at least one new second chunk request; and sending the new second chunk request to the media streamer.

Figure 12:
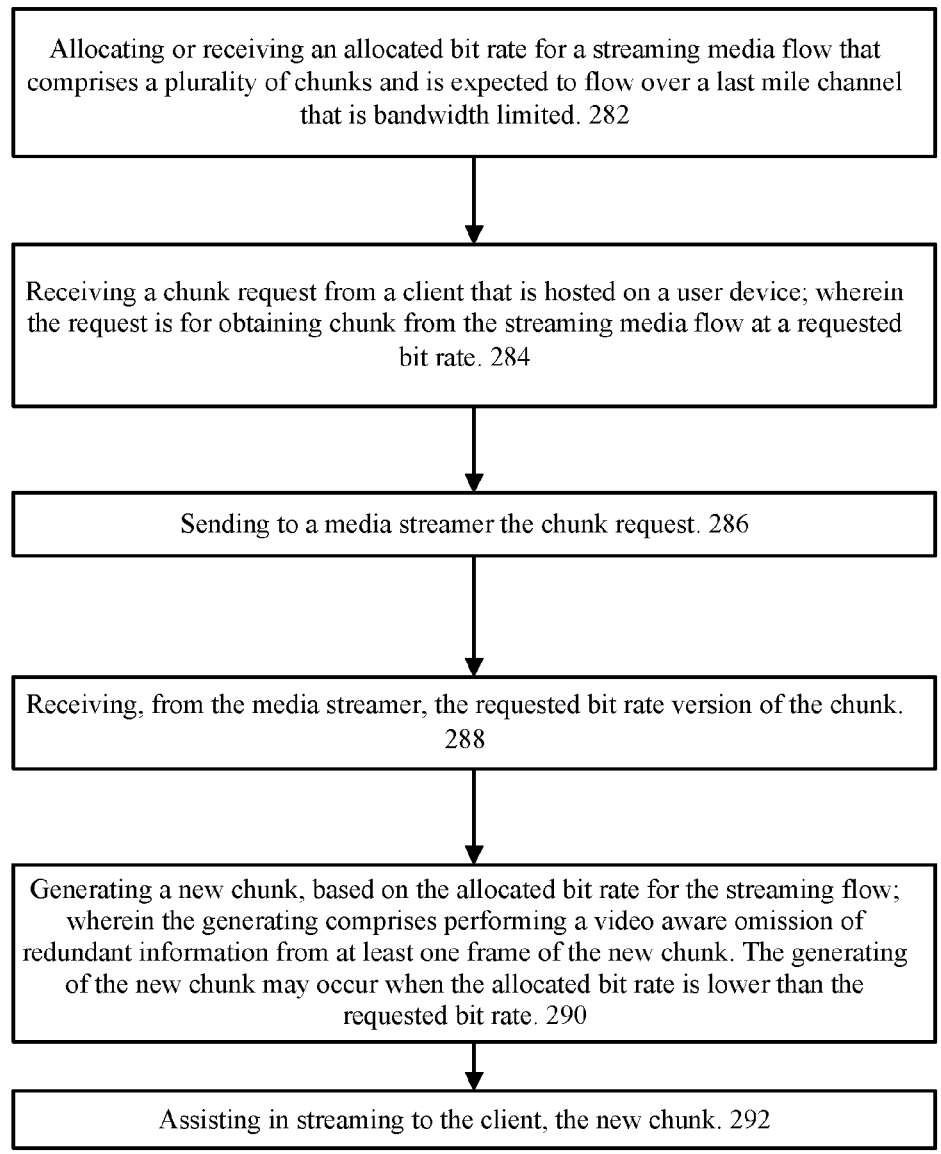
FIG. 12 illustrates a method according to an embodiment of the invention.

FIG. 12 illustrates method 280 according to an embodiment of the invention.

Method 280 may include a sequence of stages 282, 284, 286, 288, 290 and 292.

Stage 282 includes allocating or receiving an allocated bit rate for a streaming media flow that comprises a plurality of chunks and is expected to flow over a last mile channel that is bandwidth limited.

Stage 284 includes receiving a chunk request from a client that is hosted on a user device; wherein the request is for obtaining chunk from the streaming media flow at a requested bit rate.

Stage 286 includes sending to a media streamer the chunk request.

Stage 288 includes receiving, from the media streamer, the requested bit rate version of the chunk.

Stage 290 includes generating a new chunk, based on the allocated bit rate for the streaming flow; wherein the generating comprises performing a video aware omission of redundant information from at least one frame of the new chunk. The generating of the new chunk may occur when the allocated bit rate is lower than the requested bit rate.

Stage 292 includes assisting in streaming to the client, the new chunk.

The omission may include omitting redundant information from at least one frame of the first new chunk, removing frames such as non-reference frames, and the like.

Any of the methods mentioned above can be executed by a computer that executed instructions stored in a non-transitory computer readable medium of a computer program product. The computer readable medium can be a diskette, a tape, a disk, a memory chip, a compact disk and the like. It can be read by using electro-magnetic manners, electrical signals, light beams, magnetic fields and the like.

Any combination of any methods (or any stages or any method) can be provided. One or more non-transitory computer readable mediums can store instructions for any combination of any stage or any method (or of any method).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for streaming media flow management, the method comprising:

counting adaptive bit rate (ABR) flows and progressive download (PD) flows;

wherein the ABR flows and the PD flows are streaming media flows;

carving out a bit rate for video flows;

allocating, for each PD flow of the PD flows a PD bit rate thereby allocating an aggregate PD bit rate for all the PD, bit rates;

allocating ABR bit rates the ABR flows thereby allocating an aggregate ABR bit rate for all ABR flows;

wherein a sum of the aggregate ABR bit rate and the aggregate PD bit rate does not exceed the bit rate for video flows;

wherein each streaming media flow of the ABR flows and the PD flows includes a plurality of chunks and is expected to flow over a last mile channel that is bandwidth limited;

allocating bit rates for data flows;

receiving a plurality of chunk requests from clients that are hosted on user devices; wherein the plurality of chunk requests are for obtaining chunks from a plurality of streaming media flows, each chunk request defines a requested bit rate; wherein the plurality of chunk requests comprise a first chunk request that is sent from a first client and is for obtaining a first chunk of a first requested bit rate;

generating, in response to the first chunk request, a first set of chunk requests for receiving different bit rate versions of the first chunk;

sending to a media streamer the first set of chunk requests;

receiving, from the media streamer, the different bit rate versions of the first chunk;

generating a first new chunk, based on bit rate allocated for a streaming of a media flow to the first client; wherein the first new chunk comprises a plurality of frames selected from at least two bit rate versions of the first chunk; and assisting in streaming to the first client, the first new chunk.

2. The method according to claim 1, comprising generating the first new chunk that comprises at least one frame of the first requested bit rate and at least one frame of an additional bit rate that differs from the requested bit rate.

3. The method according to claim 1, wherein the first new chunk does not include any frame of the first requested bit rate.

4. The method according to claim 1, wherein the set of different bit rate versions comprises the first requested bit rate, at least one bit rate that is higher than the first requested bit rate and at least one bit rate that is lower than the requested bit rate.

5. The method according to claim 1, wherein the generating of the first new chunk comprises omitting at least one frame from the first new chuck so that the first new chunk does not include any bit rate version of the at least one frame that was included in the first chunk.

6. The method according to claim 1, comprising omitting redundant information from at least one frame of the first new chunk.

7. The method according to claim 6, wherein the redundant information comprises stuffing bits.

8. The method according to claim 1, wherein the plurality of chunk requests comprise a first group of chunk request for receiving a first group of chunks, the first group of chunk requests being sent from a first group of clients; wherein the method comprises:

generating, in response to each chunk request of the first group of chunk requests, a set of chunk requests, each set of chunk requests is for receiving different bit rate versions of the chunk requested by the chunk request of the first group of chunks;

sending to a media streamer the first set of chunk requests;

receiving, from the media streamer, the different bit rate versions of the chunks of the first group of chunks;

generating a first group of new chunks, based on bit rates allocated for streaming of media flows to the first group of the client, wherein each new chunk of the first group of new chunks comprises a plurality of frames selected from at least two bit rate versions of a chunk that corresponds to the new chunk; and assisting in streaming to the first group of clients, the first group of new chunks.

9. The method according to claim 8, wherein the plurality of chunk requests further comprises a second group of chunk requests for receiving a second group of chunks, the second group of chunk requests being sent from a second group of clients; wherein the method comprises:
sending to the media streamer the second set of chunk requests;
receiving, from the media streamer, chunks of the second group of chunks; and
assisting in streaming to the second group of clients, the second group of chunks.

10. The method according to claim 1, further comprising changing a second chunk request to comply with an allocated bit rate, if a requested bit rate associated with the second chunk does not comply with the allocated bit rate, to provide at least one new second chunk request; and
sending the new second chunk request to the media streamer.

11. A computer program product that comprises a non-transitory computer readable medium that stores instructions for:
counting adaptive bit rate (ABR) flows and progressive download (PD) flows;
wherein the ABR flows and the PD flows are streaming media flows;
carving out a bit rate for video flows;
allocating, for each PD flow of the PD flows a PD bit rate thereby allocating an aggregate PD bit rate for all the PD, bit rates;
allocating ABR bit rates the ABR flows thereby allocating an aggregate ABR bit rate for all ABR flows;
wherein a sum of the aggregate ABR bit rate and the aggregate PD bit rate does not exceed the bit rate for video flows;
wherein each streaming media flow of the ABR flows and the PD flows includes a plurality of chunks and is expected to flow over a last mile channel that is bandwidth limited;
allocating a bit rate for data flows;
receiving a plurality of chunk requests from clients that are hosted on user devices; wherein the plurality of chunk requests are for obtaining chunks from a plurality of streaming media flows, each chunk request defines a requested bit rate; wherein the plurality of chunk requests comprise a first chunk request that is sent from a first client and is for obtaining a first chunk of a first requested bit rate;
generating, in response to the first chunk request, a first set of chunk requests for receiving different bit rate versions of the first chunk;
sending to a media streamer the first set of chunk requests;
receiving, from the media streamer, the different bit rate versions of the first chunk;
generating a first new chunk, based on bit rate allocated for a streaming of a media flow to the first client; wherein the first new chunk comprises a plurality of frames selected from at least two bit rate versions of the first chunk; and
assisting in streaming to the first client, the first new chunk.

12. The computer program product according to claim 11, wherein the non-transitory computer readable medium further stores instructions for generating the first new chunk that comprises at least one frame of the first requested bit rate and at least one frame of an additional bit rate that differs from the requested bit rate.

13. The computer program product according to claim 11, wherein the first new chunk does not include any frame of the first requested bit rate.

14. The computer program product according to claim 11, wherein the set of different bit rate versions comprises the first requested bit rate, at least one bit rate that is higher than the first requested bit rate and at least one bit rate that is lower than the requested bit rate.

15. The computer program product according to claim 11, wherein the non-transitory computer readable medium further stores instructions for omitting at least one frame from the first new chuck so that the first new chunk does not include any bit rate version of the at least one frame that was included in the first chunk.

16. The computer program product according to claim 11, wherein the non-transitory computer readable medium further stores instructions for omitting redundant information from at least one frame of the first new chunk.

17. The computer program product according to claim 16, wherein the redundant information comprises stuffing bits.

18. The computer program product according to claim 11, wherein the plurality of chunk requests comprise a first group of chunk request for receiving a first group of chunks, the first group of chunk requests being sent from a first group of clients; and wherein The non-transitory computer readable medium further stores instructions for:
generating, in response to each chunk request of the first group of chunk requests, a set of chunk requests, each set of chunk requests is for receiving different bit rate versions of the chunk requested by the chunk request of the first group of chunks;
sending to a media streamer the first set of chunk requests;
receiving, from the media streamer, the different bit rate versions of the chunks of the first group of chunks;
generating a first group of new chunks, based on bit rates allocated for streaming of media flows to the first group of the client, wherein each new chunk of the first group of new chunks comprises a plurality of frames selected from at least two bit rate versions of a chunk that corresponds to the new chunk; and
assisting in streaming to the first group of clients, the first group of new chunks.

19. The computer program product according to claim 18, wherein the plurality of chunk requests further comprises a second group of chunk requests for receiving a second group of chunks, the second group of chunk requests being sent from a second group of clients; wherein the method comprises:
sending to the media streamer the second set of chunk requests;
receiving, from the media streamer, chunks of the second group of chunks; and
assisting in streaming to the second group of clients, the second group of chunks.

20. The computer program product according to claim 11, wherein the non-transitory computer readable medium further stores instructions for:
changing a second chunk request to comply with an allocated bit rate, if a requested bit rate associated with the second chunk does not comply with the allocated bit rate, to provide at least one new second chunk request; and
sending the new second chunk request to the media streamer.

21. A system comprising an input interface, a hardware processing module and an output interface;

wherein the system is arranged to count adaptive bit rate (ABR) flows and progressive download (PD) flows;
wherein the ABR flows and the PD flows are streaming media flows;
carve out a bit rate for video flows;
allocate, for each PD flow of the PD flows a PD bit rate thereby allocating an aggregate PD bit rate for all the PD, bit rates;
allocate ABR bit rates the ABR flows thereby allocating an aggregate ABR bit rate for all ABR flows;
wherein a sum of the aggregate ABR bit rate and the aggregate PD bit rate does not exceed the bit rate for video flows;
wherein each streaming media flow of the ABR flows and the PD flows includes a plurality of chunks and is expected to flow over a last mile channel that is bandwidth limited; and
allocate a bit rate for data flows;
wherein the input interface is arranged to receive a plurality of chunk requests from clients that are hosted on user devices; wherein the plurality of chunk requests are for obtaining chunks from a plurality of streaming media flows, each chunk request defines a requested bit rate; wherein the plurality of chunk requests comprise a first chunk request that is sent from a first client and is for obtaining a first chunk of a first requested bit rate;
wherein the hardware processing module is arranged to generate, in response to the first chunk request, a first set of chunk requests for receiving different bit rate versions of the first chunk;
wherein the output interface is arranged to send to a media streamer the first set of chunk requests;
wherein the input interface is further arranged to receive, from the media streamer, the different bit rate versions of the first chunk;
wherein the hardware processing module is further arranged to generate a first new chunk, based on bit rate allocated for a streaming of a media flow to the first client; wherein the first new chunk comprises a plurality of frames selected from at least two bit rate versions of the first chunk; and
wherein the output interface is arranged to assist in streaming to the first client, the first new chunk.

22. The system according to claim 21, wherein the hardware processing module is arranged to generate the first new chunk, wherein the first new chunk comprises at least one frame of the first requested bit rate and at least one frame of an additional bit rate that differs from the requested bit rate.

23. The system according to claim 21, wherein the hardware processing module is arranged to generate the first new chunk, the first new chunk does not include any frame of the first requested bit rate.

24. The system according to claim 21, wherein the set of different bit rate versions comprises the first requested bit rate, at least one bit rate that is higher than the first requested bit rate and at least one bit rate that is lower than the requested bit rate.

25. The system according to claim 21, wherein the hardware processing module is arranged to omit at least one frame from the first new chuck so that the first new chunk does not include any bit rate version of the at least one frame that was included in the first chunk.

26. The system according to claim 21, wherein the hardware processing module is arranged to omit redundant information from at least one frame of the first new chunk.

27. The system according to claim 26, wherein the redundant information comprises stuffing bits.

28. The system according to claim 21, wherein the plurality of chunk requests comprise a first group of chunk request for receive a first group of chunks, the first group of chunk requests being sent from a first group of clients;
wherein the hardware processing module is arranged to generate, in response to each chunk request of the first group of chunk requests, a set of chunk requests, each set of chunk requests is for receive different bit rate versions of the chunk requested by the chunk request of the first group of chunks;
wherein the output interface is further arranged to send to a media streamer the first set of chunk requests;
wherein the input interface is further arranged to receive, from the media streamer, the different bit rate versions of the chunks of the first group of chunks;
wherein the hardware processing module is arranged to generate a first group of new chunks, based on bit rates allocated for streaming of media flows to the first group of the client;
wherein each new chunk of the first group of new chunks comprises a plurality of frames selected from at least two bit rate versions of a chunk that corresponds to the new chunk; and
wherein the output interface is arranged to assist in streaming to the first group of clients, the first group of new chunks.

29. The system according to claim 28, wherein the plurality of chunk requests further comprises a second group of chunk requests for receive a second group of chunks, the second group of chunk requests being sent from a second group of clients; wherein the system is arranged to
send to the media streamer the second set of chunk requests; receive, from the media streamer, chunks of the second group of chunks; and assist in streaming to the second group of clients, the second group of chunks.

30. The system according to claim 21, further wherein the hardware processing module is arranged to change a second chunk request to comply with an allocated bit rate, if a requested bit rate associated with the second chunk does not comply with the allocated bit rate, to provide at least one new second chunk request; and send the new second chunk request to the media streamer.

31. A method, comprising:
counting adaptive bit rate (ABR) flows and progressive download (PD) flows;
wherein the ABR flows and the PD flows are streaming media flows;
carving out a bit rate for video flows;
allocating, for each PD flow of the PD flows a PD bit rate thereby allocating an aggregate PD bit rate for all the PD, bit rates;
allocating ABR bit rates the ABR flows thereby allocating an aggregate ABR bit rate for all ABR flows;
wherein a sum of the aggregate ABR bit rate and the aggregate PD bit rate does not exceed the bit rate for video flows;
wherein each streaming media flow of the ABR flows and the PD flows includes a plurality of chunks and is expected to flow at a requested constant bit rate over a last mile channel that is bandwidth limited;
allocating a bit rate for data flows;
receiving a plurality of chunk requests from clients that are hosted on user devices; wherein the plurality of chunk requests are for obtaining chunks from a plurality of streaming media flows, each chunk request defines a requested bit rate;

sending to a media streamer the plurality of chunk requests;

receiving, from the media streamer, a chunk that is scheduled for size reduction; wherein the chunk was requested by a chunk request out of the plurality of chunk requests;

reducing a size of the chunk by removing excess information, to provide a reduced chunk;

assisting in streaming to a client, the reduced chunk; wherein the reduced chunk is being streamed to the client at a bit rate that is lower than a requested constant bit rate associated with the client;

receiving from the client an acknowledgement message sent from the client towards the media streamer; and delaying a transmission of the acknowledgement messages to the media streamer sent from the client in order to reduce a number of chunks of a media stream pending to be viewed by a user.

32. The method according to claim 31, wherein the reducing of the size comprises omitting a frame of the chunk.

33. The method according to claim 31, wherein the reducing of the size comprises omitting excessive information included in at least one frame of the chunk.

34. The method according to claim 31, wherein the reducing of the size of the chunk comprises omitting at least one frame from the chuck so that the reduced chunk does not include any bit rate version of the at least one frame that was included in the chunk.

35. A method for streaming media flow management, the method comprising:

counting adaptive bit rate (ABR) flows and progressive download (PD) flows;

wherein the ABR flows and the PD flows are streaming media flows;

carving out a bit rate for video flows;

allocating, for each PD flow of the PD flows a PD bit rate thereby allocating an aggregate PD bit rate for all the PD, bit rates;

allocating ABR bit rates the ABR flows thereby allocating an aggregate ABR bit rate for all ABR flows;

wherein a sum of the aggregate ABR bit rate and the aggregate PD bit rate does not exceed the bit rate for video flows;

wherein each streaming media flow of the ABR flows and the PD flows includes a plurality of chunks and is expected to flow over a last mile channel that is bandwidth limited;

allocating bit rates for data flows;

receiving a chunk request from a client that is hosted on a user device; wherein the request is for obtaining chunk from the streaming media flow at a requested bit rate;

sending to a media streamer the chunk request;

receiving, from the media streamer, the requested bit rate version of the chunk;

generating a new chunk, based on the allocated bit rate for the streaming flow; wherein the generating comprises performing a video aware omission of redundant information from at least one frame of the new chunk;

assisting in streaming to the client, the new chunk;

receiving from the client an acknowledgement message sent from the client towards the media streamer; and delaying a transmission of the acknowledgement messages to the media streamer sent from the client in order to reduce a number of chunks of a media stream pending to be viewed by a user.

36. The method according to claim 35, comprising omitting redundant information from at least one frame of the first new chunk.

37. The method according to claim 35, wherein the redundant information comprises stuffing bits.

* * * * *